(12) United States Patent
Faber et al.

(10) Patent No.: US 9,305,304 B2
(45) Date of Patent: Apr. 5, 2016

(54) METHODS AND APPARATUSES TO SELECT COMMUNICATION TRACKING MECHANISMS

(71) Applicant: YELLOWPAGES.COM LLC, Tucker, GA (US)

(72) Inventors: Scott Faber, San Francisco, CA (US); Ebbe Altberg, Mill Valley, CA (US); Ron Hirson, San Francisco, CA (US); Sean Van Der Linden, Berkeley, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 0 days.

(21) Appl. No.: 14/735,814

(22) Filed: Jun. 10, 2015

(65) Prior Publication Data

US 2015/0379560 A1     Dec. 31, 2015

Related U.S. Application Data

(63) Continuation of application No. 11/565,546, filed on Nov. 30, 2006, now Pat. No. 9,087,336.

(60) Provisional application No. 60/862,710, filed on Oct. 24, 2006.

(51) Int. Cl.
*G06Q 30/00* (2012.01)
*G06Q 30/02* (2012.01)

(52) U.S. Cl.
CPC ........ *G06Q 30/0246* (2013.01); *G06Q 30/0277* (2013.01)

(58) Field of Classification Search
USPC ............... 379/114.13, 265.06, 112.1, 265.05; 705/14.46, 14.41, 14.52, 14.53, 14.55, 705/14.66, 14.69, 14.67, 14.68, 14.72
See application file for complete search history.

(56) References Cited

U.S. PATENT DOCUMENTS

| 4,788,718 A | 11/1988 | McNabb et al. |
| 5,793,851 A | 8/1998 | Albertson |

(Continued)

FOREIGN PATENT DOCUMENTS

| JP | 2002278858 | 9/2002 |
| JP | 2003337896 | 11/2003 |

(Continued)

OTHER PUBLICATIONS

International Application No. PCT/US04/15238, Written Opinion and International Search Report, Aug. 29, 2005.

(Continued)

*Primary Examiner* — Yosef K Laekemariam
(74) *Attorney, Agent, or Firm* — Alston & Bird LLP

(57) ABSTRACT

Methods and apparatuses to select tracking mechanisms for the performance determination of advertisements. One embodiment includes: selecting one reference type from a plurality of reference types; and determining a reference of the selected type, the reference to be embedded in an advertisement to count communication leads generated from the advertisement. In one embodiment, the advertisement is to be charged according to a performance measure based on communication leads generated from the advertisement. For example, a price for the advertisement can be specified by a party for which the advertisement is to be presented. For example, the advertisement can be charged in response to a voice communication responding to the advertisement. In one embodiment, the plurality of reference types correspond to different mechanisms to track communication leads generated from the advertisement.

17 Claims, 30 Drawing Sheets

(56) References Cited

U.S. PATENT DOCUMENTS

| | | |
|---|---|---|
| 6,570,870 B1 | 5/2003 | Berstis |
| 6,690,672 B1 | 2/2004 | Klein |
| 6,882,985 B1 | 4/2005 | Kay et al. |
| 7,177,415 B1 | 2/2007 | Kim et al. |
| 7,305,489 B2 | 12/2007 | Puthiyandyil et al. |
| 7,340,048 B2 | 3/2008 | Stern et al. |
| 7,428,497 B2 | 9/2008 | Agarwal et al. |
| 7,450,566 B2 | 11/2008 | Wong |
| 7,533,144 B2 | 5/2009 | Kassab |
| 7,548,915 B2 | 6/2009 | Ramer et al. |
| 7,734,502 B1 | 6/2010 | Yehoshua et al. |
| 7,876,886 B2 | 1/2011 | Altberg et al. |
| 8,027,878 B2 | 9/2011 | Wong et al. |
| 8,095,467 B2 | 1/2012 | Bettinger |
| 2002/0075844 A1 | 6/2002 | Hagen |
| 2002/0095367 A1 | 7/2002 | Mizunuma et al. |
| 2002/0124188 A1 | 9/2002 | Sherman et al. |
| 2002/0133446 A1 | 9/2002 | Lee |
| 2002/0167919 A1 | 11/2002 | Marples et al. |
| 2003/0220866 A1 | 11/2003 | Pisaris-Henderson et al. |
| 2004/0103024 A1 | 5/2004 | Patel et al. |
| 2004/0234043 A1 | 11/2004 | Argo |
| 2004/0234064 A1 | 11/2004 | Melideo |
| 2004/0243939 A1 | 12/2004 | Perepa et al. |
| 2004/0249951 A1 | 12/2004 | Grabelsky |
| 2005/0018849 A1 | 1/2005 | Rodriguez et al. |
| 2005/0044238 A1 | 2/2005 | Jacob et al. |
| 2005/0049971 A1 | 3/2005 | Bettinger |
| 2005/0114208 A1 | 5/2005 | Arbuckle et al. |
| 2005/0256766 A1 | 11/2005 | Garcia et al. |
| 2005/0289097 A1 | 12/2005 | Trossen et al. |
| 2006/0069610 A1 | 3/2006 | Rossini |
| 2006/0074760 A1 | 4/2006 | Helin |
| 2006/0075104 A1 | 4/2006 | Kumer |
| 2006/0078096 A1 | 4/2006 | Poyhonen et al. |
| 2006/0165068 A1 | 7/2006 | Dalton et al. |
| 2007/0005585 A1 | 1/2007 | Feng et al. |
| 2007/0112656 A1 | 5/2007 | Howe et al. |
| 2007/0130338 A1 | 6/2007 | Malik et al. |
| 2007/0177578 A1 | 8/2007 | Anspach et al. |
| 2007/0202881 A1 | 8/2007 | Dervan |
| 2007/0206506 A1 | 9/2007 | Purpura |
| 2007/0242626 A1 | 10/2007 | Altberg et al. |
| 2008/0005268 A1 | 1/2008 | Chen |
| 2008/0008306 A1 | 1/2008 | Kilger |
| 2008/0071554 A1 | 3/2008 | Miles et al. |
| 2008/0107102 A1 | 5/2008 | Kaufman et al. |
| 2008/0144604 A1 | 6/2008 | Sharma et al. |
| 2009/0113312 A1 | 4/2009 | Schoenberg |
| 2009/0138317 A1 | 5/2009 | Schoenberg |
| 2009/0323670 A1 | 12/2009 | Altberg et al. |
| 2010/0191657 A1 | 7/2010 | Melideo |

FOREIGN PATENT DOCUMENTS

| | | |
|---|---|---|
| JP | 2005141583 | 6/2005 |
| KR | 20010086595 | 9/2001 |
| KR | 20030043827 | 6/2003 |
| WO | 99/57643 | 3/1999 |
| WO | 03102738 | 12/2003 |

OTHER PUBLICATIONS

International Application No. PCT/US07/82445, Written Opinion and International Search Report, May 23, 2008.

USPTO Transaction History of U.S. Appl. No. 10/679,982, filed Oct. 6, 2003, entitled "Method and Apparatus to Provide Pay-Per-Call Performance Based Advertising," now U.S. Pat. No. 7,120,235.

USPTO Transaction History of U.S. Appl. No. 11/021,939, filed Dec. 23, 2004, entitled "Method and Apparatus to Compensate Demand Partners in a Pay-PerCall Performance Based Advertising System."

USPTO Transaction History of U.S. Appl. No. 11/508,015, filed Aug. 21, 2006, entitled "Method and Apparatus to Provide Pay-Per-Call Performance Based Advertising."

USPTO Transaction History of U.S. Appl. No. 11/559,866, filed Nov. 14, 2006, entitled "Methods and Apparatuses to Track Keywords for Establish Communication Links."

USPTO Transaction History of U.S. Appl. No. 11/752,267, filed May 22, 2007, entitled "Methods and Apparatuses to Connect People for Real Time Communications via Voice over Internet Protocol (VoIP)."

USPTO Transaction History of U.S. Appl. No. 11/761,800, filed Jun. 12, 2007, entitled "Methods and Apparatuses to Track Information Using Call Signaling Messages."

USPTO Transaction History of U.S. Appl. No. 11/761,987, filed Jun. 12, 2007, entitled "Methods and Apparatuses to Track Information via Telephonic Apparatuses."

USPTO Transaction History of U.S. Appl. No. 12/114,603, filed May 2, 2008, entitled "Systems and Methods to Facilitate Searches of Communication References."

International Application No. PCT/US2008/059687, Written Opinion and International Search Report, Aug. 25, 2008.

FUNCTIONAL DESCRIPTION OF SYSTEM

← 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS        scroll down for more listings

Dream Car Rentals                                    Cite Gold
3734 Las Vegas Blvd.
LAS VEGAS, NV
Phone: (702) 555-6661
Fax: (702) 555-6665
We Specialize in Excitement! Ferrari's. Viper's
Porsche's & Hummers. Harley-Davidson's
and SUV's "DRIVE THE DREAM"

Cite Gold
RENT-A-VETTE
5021 SWENSON STREET
LAS VEGAS, NV 89119
Phone: (702) 555-2692
Fax: (702) 555-2044

ONLINE LISTINGS                    scroll down for more listings

Expedia: For All Your Car Rental Needs  http://www.expedia.com
Save with Expedia.com, your one-stop source for flights, hotels, vacation
packages, cruises, and rental

FIG. 9

METHODS AND APPARATUSES TO SELECT COMMUNICATION TRACKING MECHANISMS

The present application is a continuation of U.S. patent application Ser. No. 11/565,546, filed on Nov. 30, 2006, entitled "Methods and Apparatuses to Select Communication Tracking Mechanisms," which claims priority to Provisional U.S. Patent Application Ser. No. 60/862,710, filed on Oct. 24, 2006, entitled "Methods and Apparatuses to Select Communication Tracking Mechanisms," the disclosures of each of which are hereby incorporated herein by reference. This application is related to: U.S. patent application Ser. No. 11/077,655, filed Mar. 10, 2005, claiming priority to Provisional U.S. Patent Application 60/653,708, filed Feb. 16, 2005, Provisional U.S. Patent Application Ser. No. 60/568,156, filed May 4, 2004, Provisional U.S. Patent Application Ser. No. 60/560,926, filed Apr. 9, 2004, and Provisional U.S. Patent Application Ser. No. 60/552,124, filed Mar. 10, 2004; U.S. patent application Ser. No. 11/092,309, filed Mar. 28, 2005, claiming priority to Provisional U.S. Patent Application 60/653,660, filed Feb. 16, 2005; U.S. patent application Ser. No. 11/095,853, filed Mar. 30, 2005, claiming priority to Provisional U.S. Patent Application 60/653,661, filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; and U.S. patent application Ser. No. 10/679,982, filed Oct. 6, 2003. The disclosures of each of the above-referenced applications are hereby incorporated herein by reference.

TECHNOLOGY FIELD

At least some embodiments of the present invention relate to telephonic connections and advertising in general and performance-based advertising in particular.

BACKGROUND

Telephone systems allow users to conduct real time two-way voice communication, Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY

Methods and apparatuses to select tracking mechanisms for the performance determination of advertisements are described here. Some embodiments of the present invention are summarized in this section.

One embodiment includes: selecting one reference type from a plurality of reference types; and determining a reference of the selected type, the reference to be embedded in an advertisement to count communication leads generated from the advertisement. In one embodiment, the advertisement is to be charged according to a performance measure based on communication leads generated from the advertisement. For example, a price for the advertisement can be specified by a party for which the advertisement is to be presented. For example, the advertisement can be charged in response to a voice communication responding to the advertisement. In one embodiment, the plurality of reference types correspond to different mechanisms to track communication leads generated from the advertisement.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

FIG. 9 shows an example of a search engine result page, which includes an advertisement generated, in accordance with one embodiment of the present invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
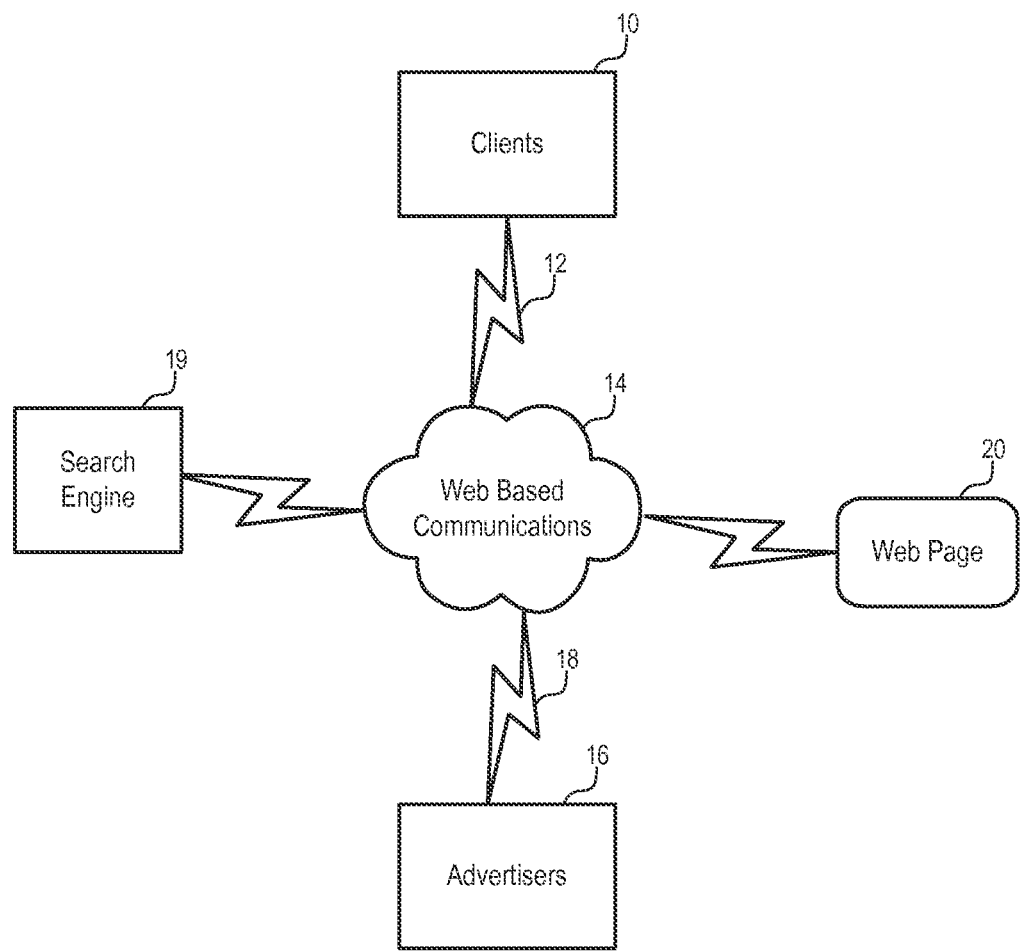
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
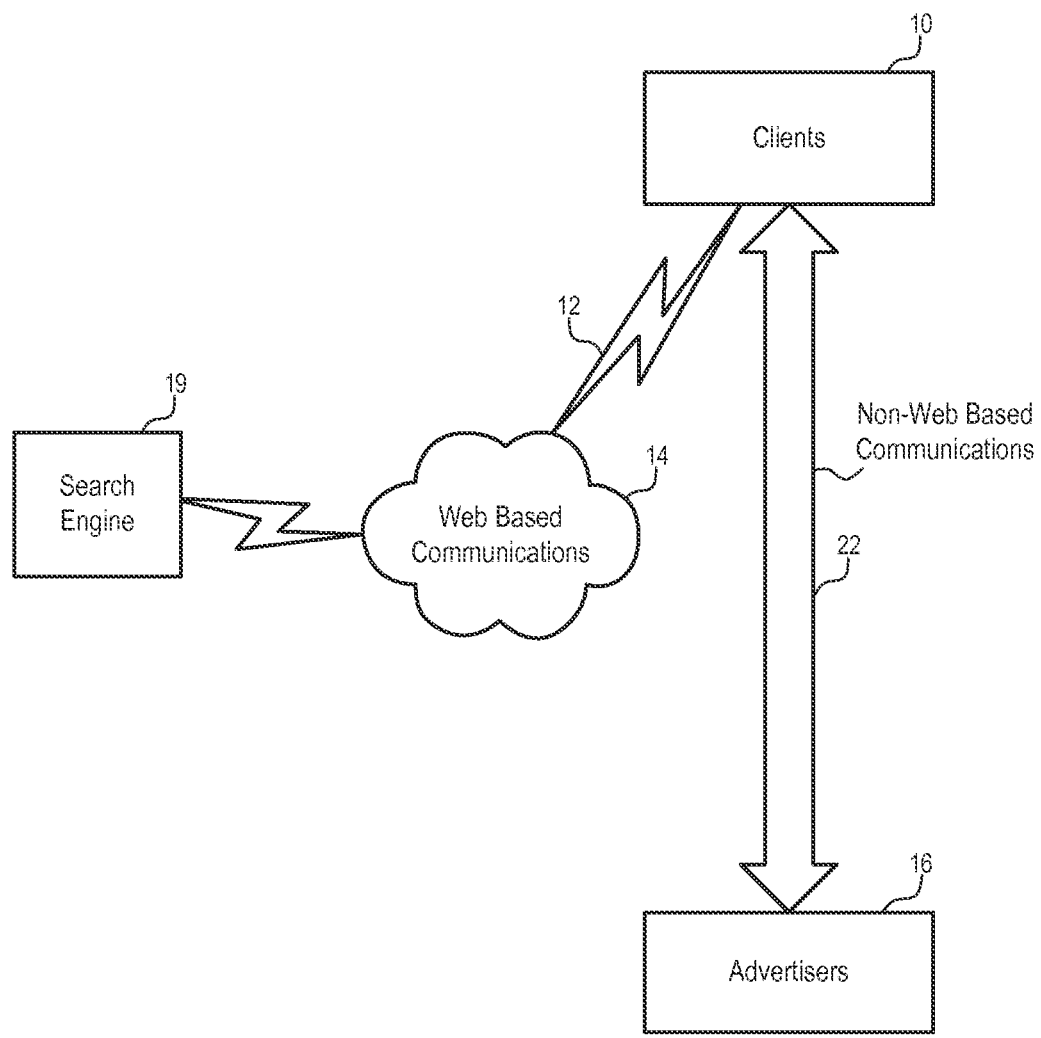
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
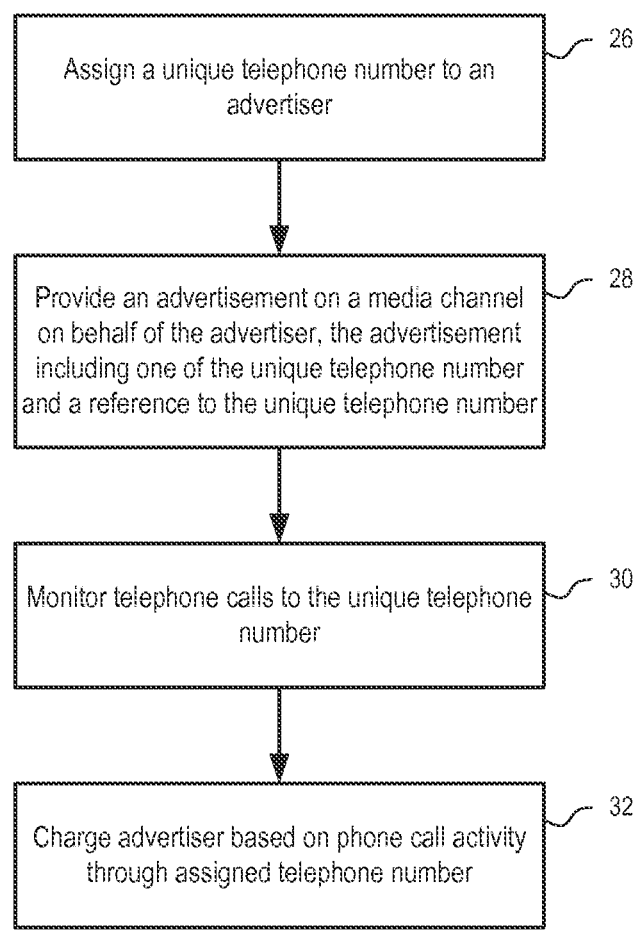
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
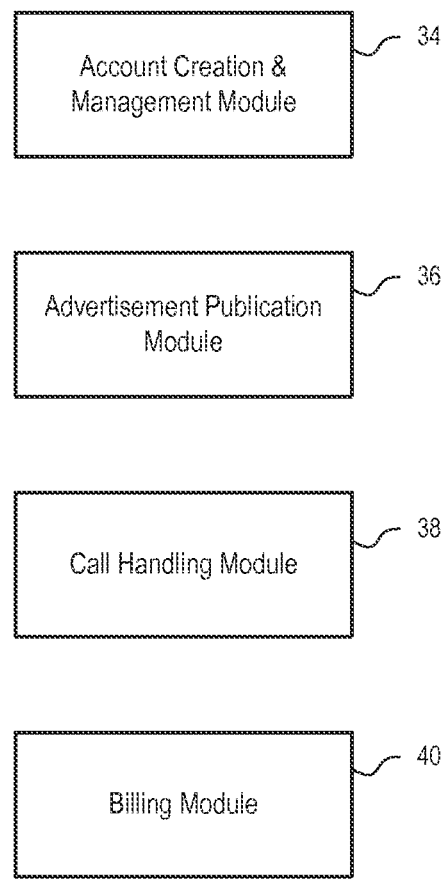
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
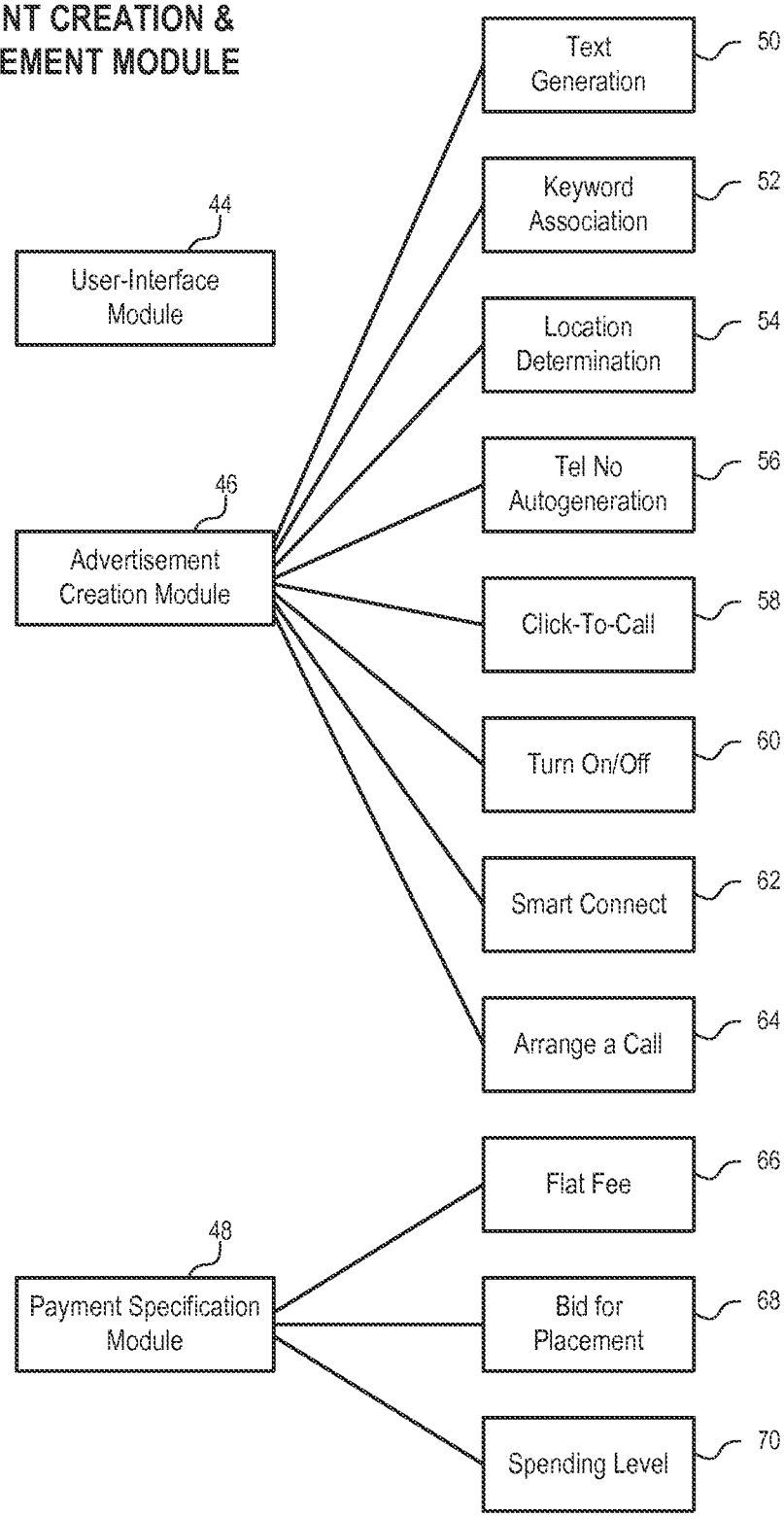
FIG. 5 illustrates the Account Creation and Management module of the system, in greater detail.
Figure 8A:
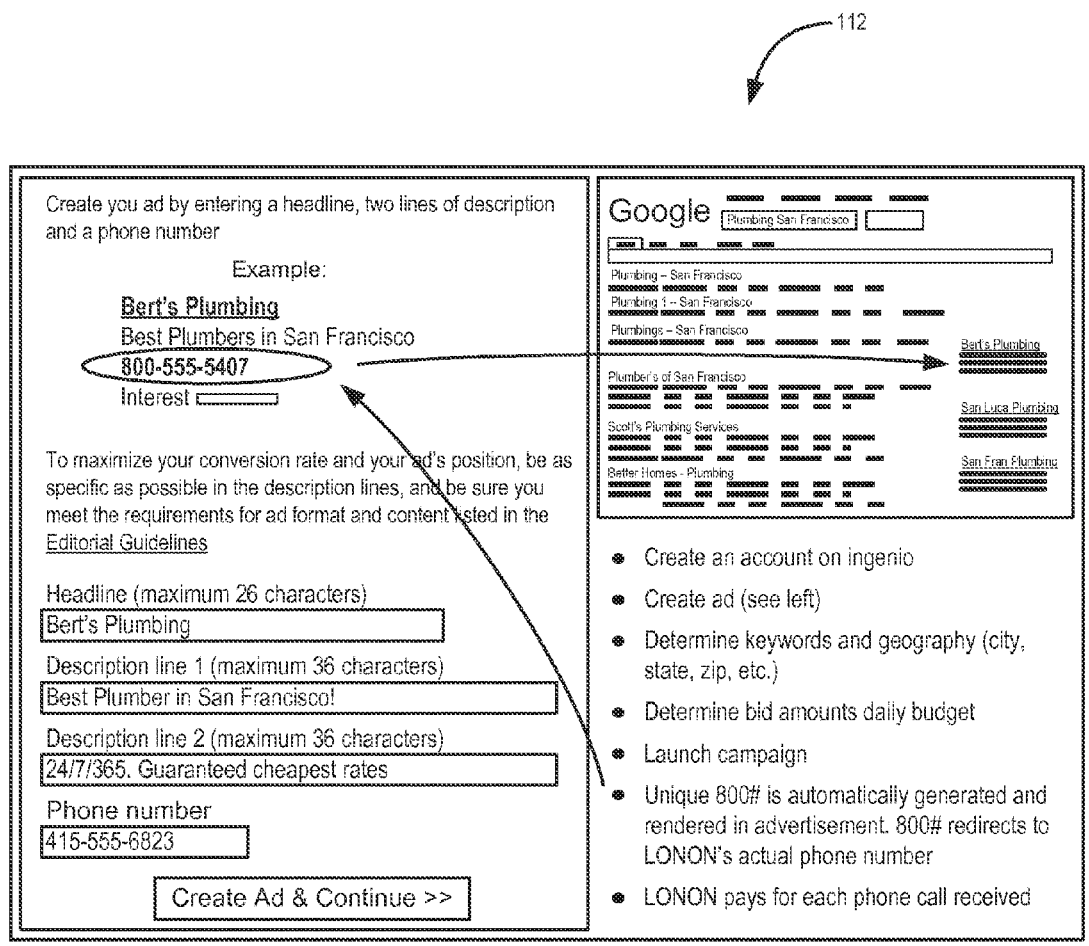
FIG. 8A shows an example of a user interface that may be presented to a user during advertisement creation, in accordance with one embodiment of the present invention.
Figure 8B:
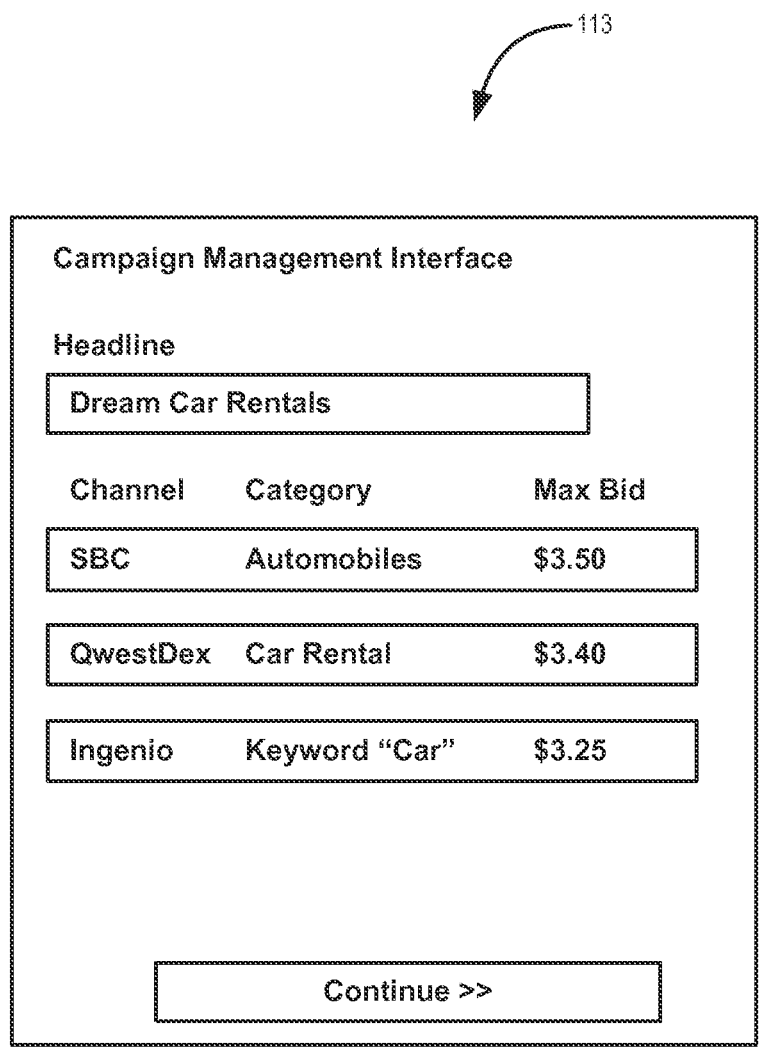
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input, for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional finds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
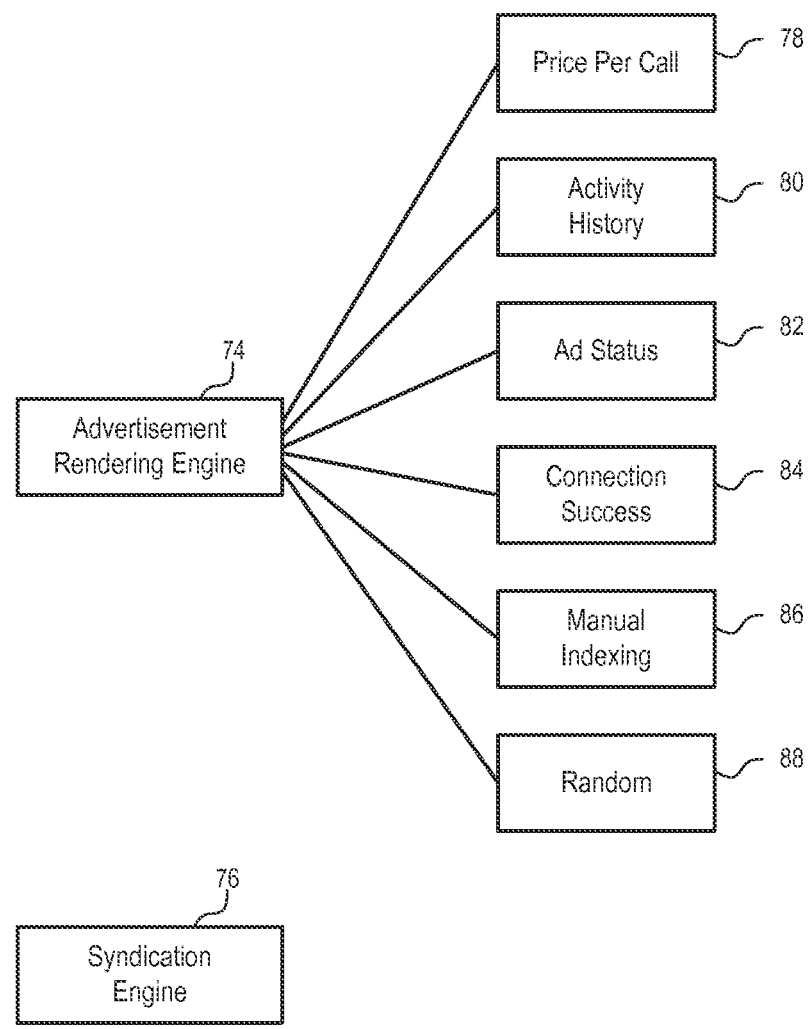
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
| --- | --- | --- |
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
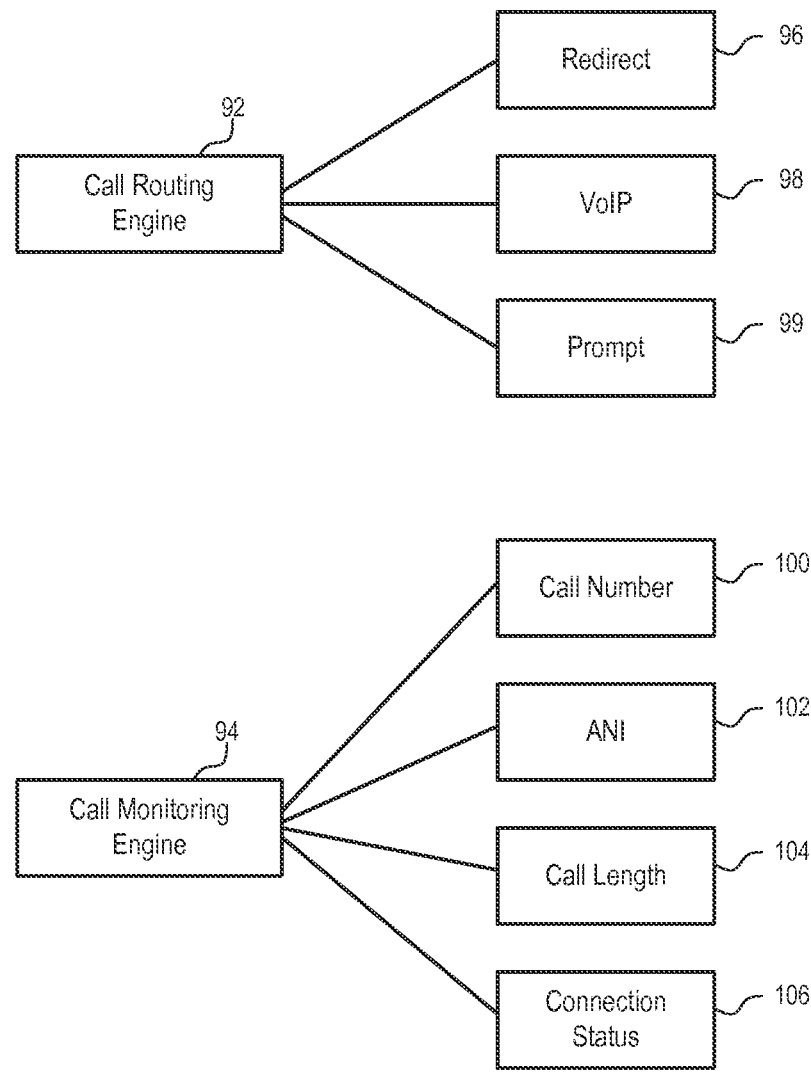
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
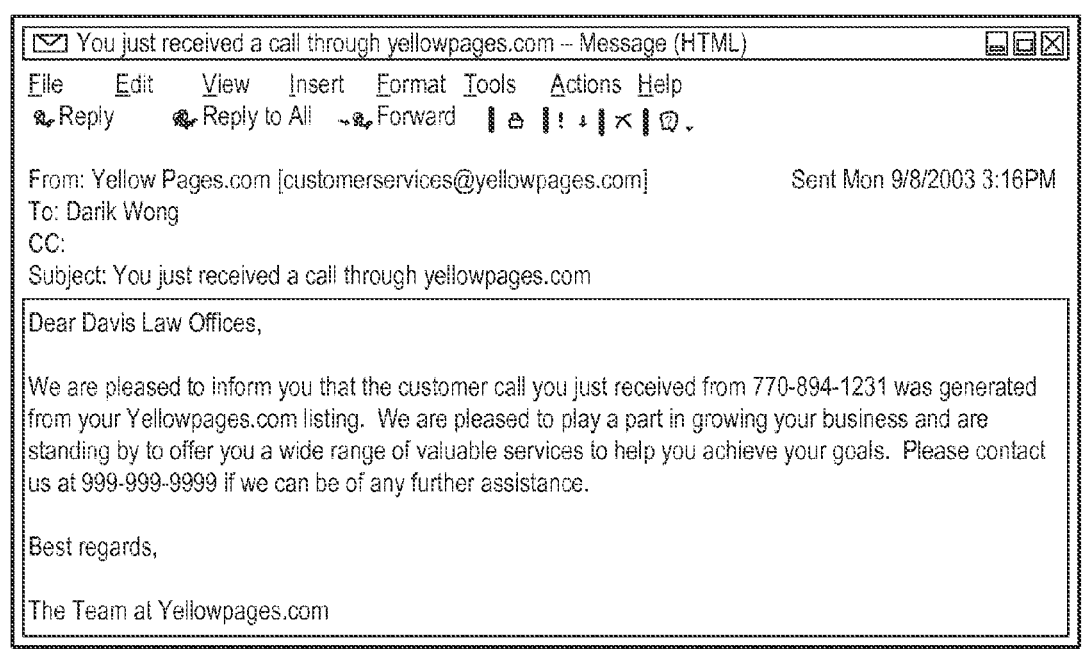
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. In one embodiment, the report provides additional information based on an address lookup of the ANI, including but not limited to demographic, socioeconomic, and psychometric information. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
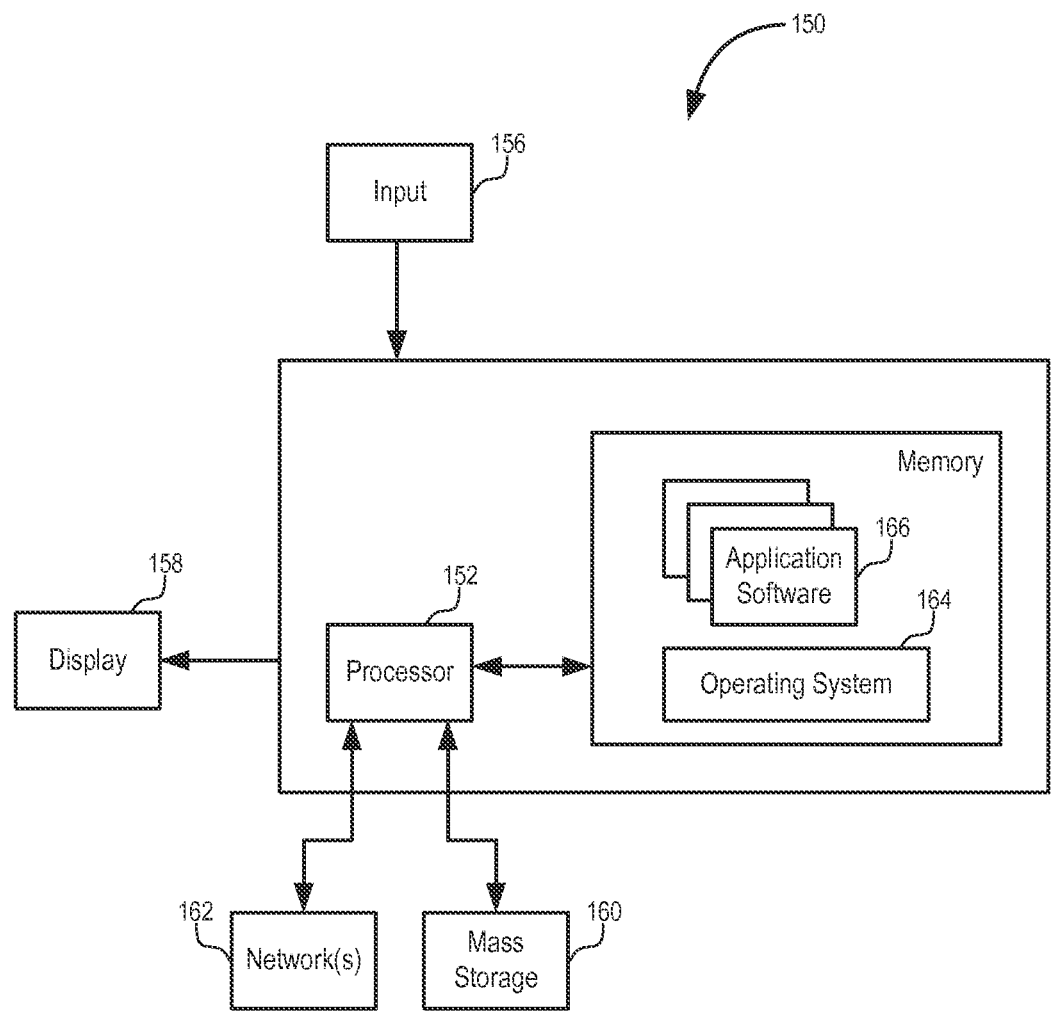
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table Above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
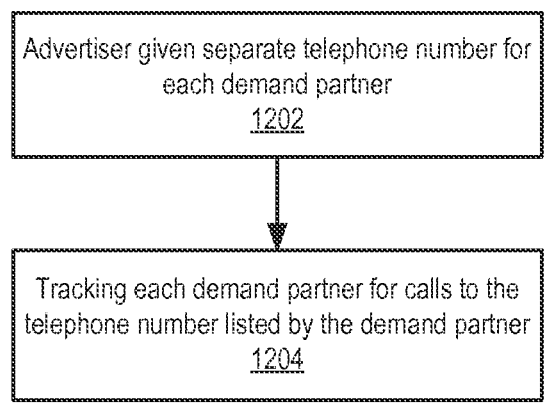
FIGS. 12-19 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
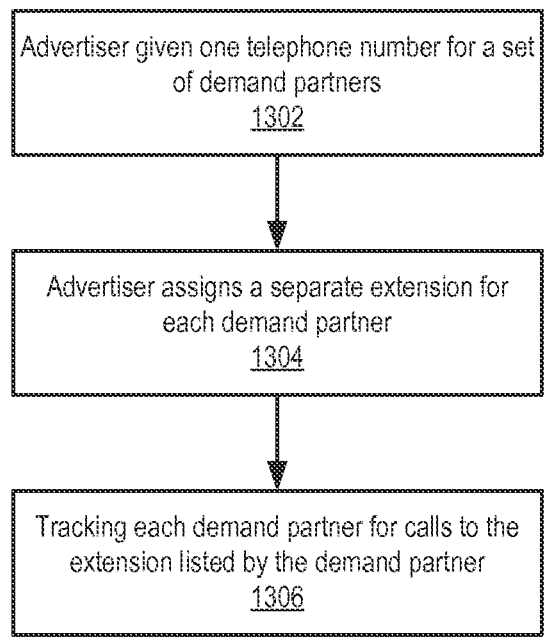

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the Respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
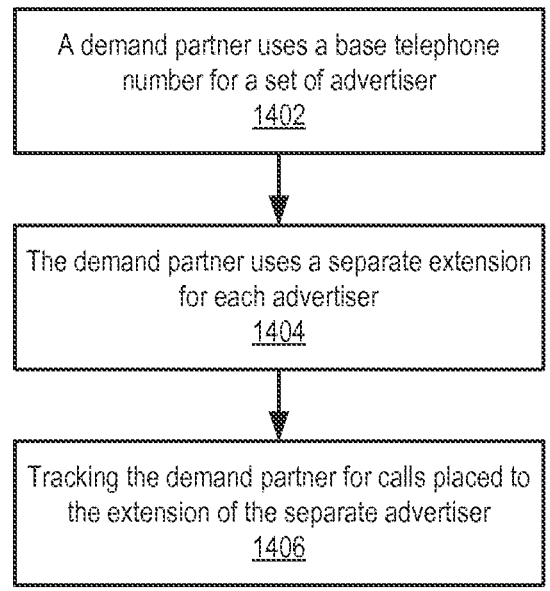

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
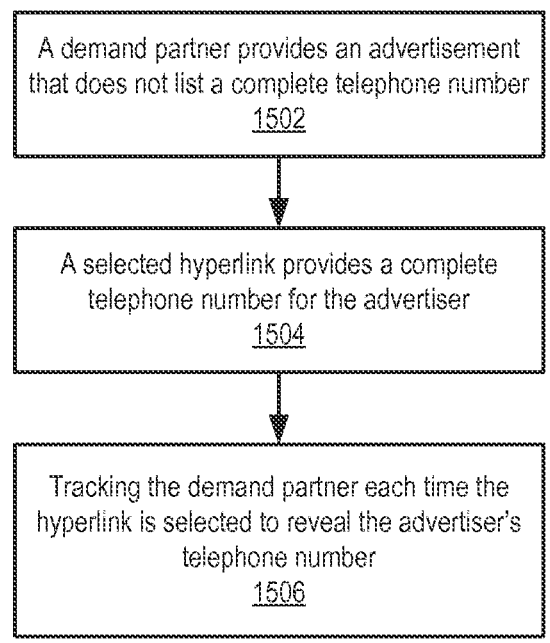

According to another embodiment, a click-to-reveal method is proposed, as described in co-pending US. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
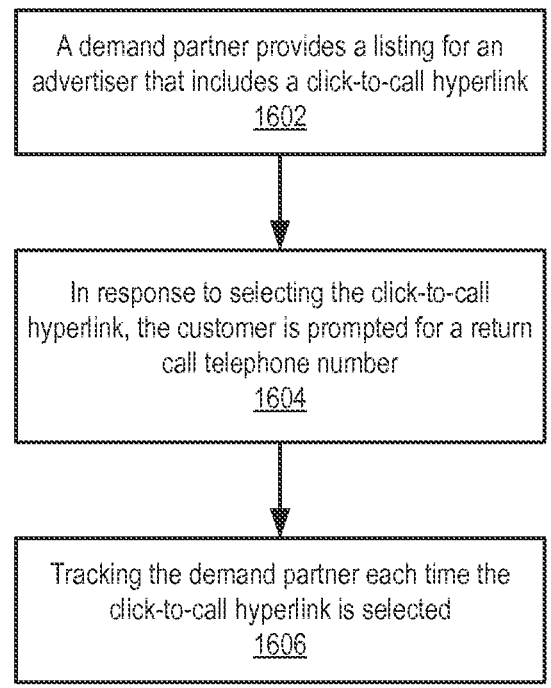

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
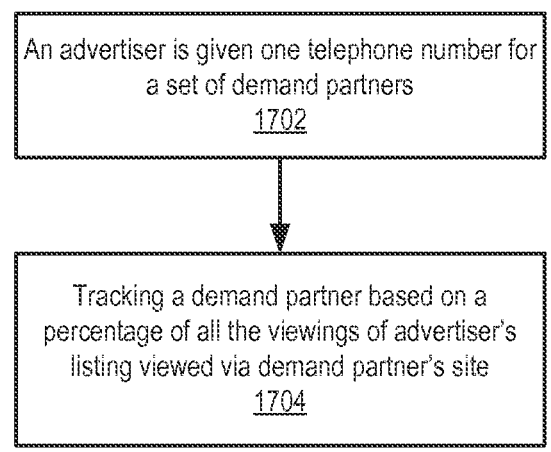

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
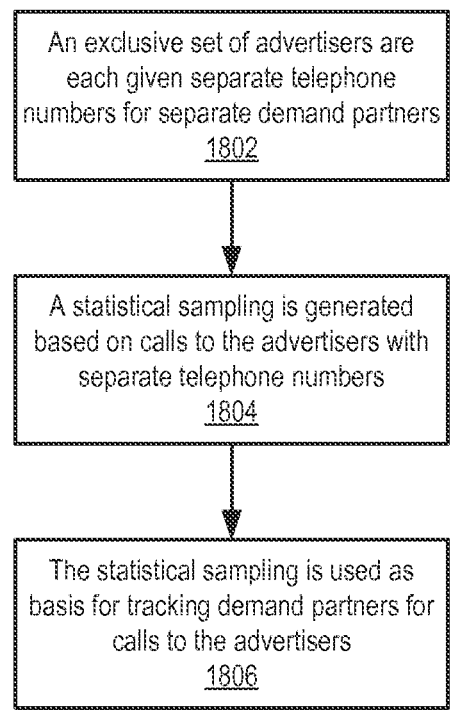

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

A potential problem with this approach is that it can require very many unique phone numbers. A single plumber could have five different advertisements, which each could be syndicated across 100 web-site directories, resulting in the provisioning of 500 unique phone numbers just to track the call distribution of a single plumber A directory with 100,000 advertisers would need many millions of unique phone numbers to track call distribution. Unique phone numbers, either local numbers or toll-free 1-800 numbers, can be expensive to provision. Using large quantities of them as outlined above is prohibitively expensive.

One embodiment of the present invention, therefore, provides a system to allocate and recycle telephone numbers. In one embodiment, the telephone numbers are allocated dynamically, only when they are needed. As a result, far fewer numbers are necessary. For instance, it could be that a particular plumber's advertisement for "industrial shower heads" might never be displayed at a certain search engine website. It would therefore be wasteful to allocate a unique phone number for that advertisement at that website. Only if a customer searches for "industrial shower heads" at that particular website should the system, dynamically, at that moment, allocate a unique phone number. This way, numbers would only be allocated when they are needed, and waste would be reduced.

In addition, one embodiment of the present invention recycles numbers, thereby further reducing the total amount of numbers needed. For example, if a certain amount of time has passed since a unique number has been displayed, the system may automatically consider the number "clean" and recycle it, placing it back into the pool of numbers. Similarly, if a certain amount of time has passed since a unique number has been called, the system may automatically consider the number "clean" and recycle it, placing it back into the pool of numbers. Using these and other parameters, one embodiment of the present invention conserves and recycles unique telephone numbers, requiring less telephone numbers and potentially reducing cost.

Figure 19:
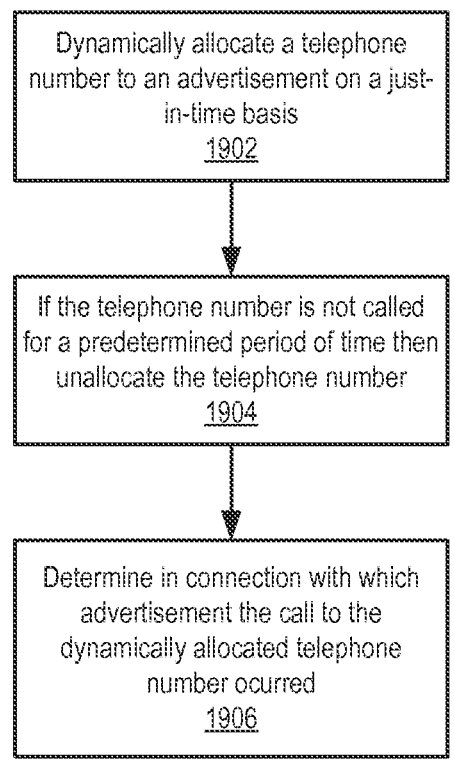

FIG. 19 provides a flow diagram describing the processes of allocating telephone numbers in accordance with one embodiment. Referring to FIG. 19, in process 1902 a telephone number is dynamically allocated to an advertisement on a just-in-time basis. For example, the telephone number is allocated in response to an end-user search submitted to a demand partner that would call for a particular advertiser's telephone number to be displayed. In one embodiment, a pool of unallocated telephone numbers is maintained. An unallocated telephone number is a telephone number that is not preassigned or linked in any way to a particular advertisement, advertiser, or demand partner. The process 1902 is performed by selecting a telephone number from the pool of unallocated telephone numbers and allocating the selected telephone number to the advertisement on a just-in-time basis. By use of the term "just-in-time basis" it is meant that the telephone number remains in the pool of unallocated telephone numbers and gets assigned or allocated to a particular advertisement just before a customer is about to view an advertisement that would include the telephone number.

In process 1904, if the telephone number that was allocated to the advertisement is not called for a predefined period of time, then the telephone number is unallocated and recycled into the pool of unallocated telephone numbers. For example, in one embodiment, the predefined period may be a fixed number of days. If no telephone call is made to the telephone number, then the telephone number gets unallocated.

In reference to FIG. 19, if the allocated telephone number does get called within the predefined time period, then the telephone number is correlated with the advertisement/advertiser to which it was allocated. Once the telephone call using the allocated telephone number is made, then the allocated telephone number is assigned to the advertiser associated with the advertisement (herein after the "associated advertisement"). Otherwise, if the allocated telephone number is not called, then the number remains free, and may be used for all demand partners.

In one embodiment, if the advertisement served by a demand partner results in a query, but no telephone call, then the dynamically allocated telephone number is associated with the advertisement for a predefined period of time. If the dynamically allocated telephone number is called within that predefined period of time, then the telephone number is associated with the advertisement for a longer period of time.

Referring again to FIG. 19, in process 1906, it is determined in connection with which advertisement the call to the allocated telephone number occurred. This determination is made for purposes of compensating/crediting demand partner that was the effective cause of the telephone call to the allocated telephone number.

Figure 20:
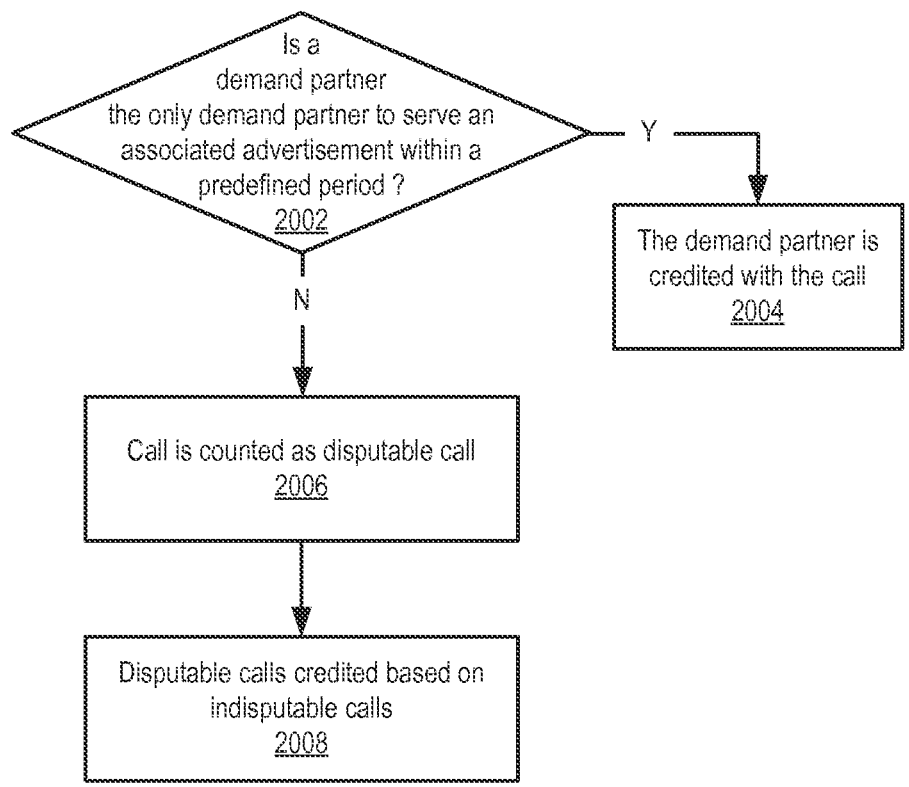
FIG. 20 presents a flow diagram describing the process of determining a demand partner to be credited with serving an advertisement that produced a phone call.

FIG. 20 presents a flow diagram describing the process of determining a demand partner to be credited with serving an advertisement that produced a phone call. In one embodiment, the determination is based on a temporal proximity between when a demand partner served the associated advertisement, and when the call occurred. In process 2002, if a particular demand partner was the only demand partner that served the associated advertisement within a predefined time period before the call occurred, then in process 2004 the particular demand partner is determined to be the demand partner in connection with which the call occurred. For example, if a demand partner X was the only demand partner that served the associated advertisement say within the past 30 minutes, then the demand partner X is determined to be the demand partner in connection with which the telephone call was made.

In one embodiment, if more than one demand partner served the associated advertisement within a predefined time period before the call occurred, then in process 2006 the telephone call is counted as part of a pool of disputable telephone calls. In one embodiment, in process 2008 credit is given to particular demand partners for which calls are placed in the pool of disputable calls, based on the proportion of indisputable calls attributable to the particular demand partner. For example, if a particular demand partner X has been attributed 70% off the indisputable calls, then demand partner X will also be attributed 70% off the calls in the disputable pool.

Figure 21:
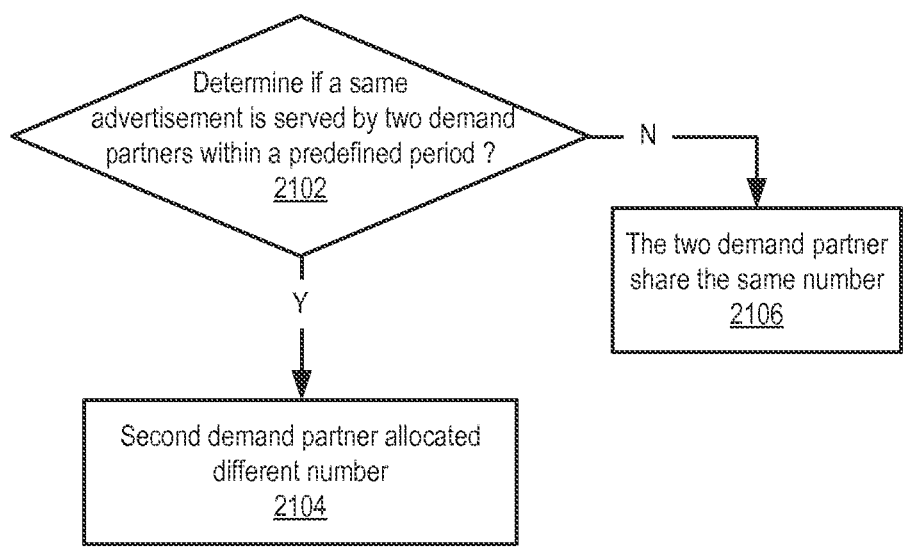
FIG. 21 presents a flow diagram describing the processes of allocating a telephone number for an advertiser/advertisement to multiple demand partners.

In another embodiment, the same telephone number may be allocated to different demand partners for the same advertiser/advertisement, thereby to reduce the number of required telephone numbers. FIG. 21 presents a flow diagram describing the processes of allocating a telephone number for an advertiser/advertisement to multiple demand partners. In process 2102, if an advertisement is served by a first demand partner, and then by a second demand partner within a predefined period of time, say 30 minutes, then in process 2104 the second demand partner would be allocated a new or different telephone number. However, if the service on the second demand partner occurs beyond the predefined period of time (30 minutes), then in process 2106 the same telephone number may be allocated to the second demand partner. In general, the longer the period within which no call occurs after the first service, the more feasible it becomes to use the same telephone number allocated to the first demand partner since the probability of having a disputable telephone.

Example Implementation of Allocating Telephone Numbers

An example of the one embodiment of the A web advertising company promotes advertisements from local merchants—plumbers, roofers, dentists—all across the country. It promotes the advertisements by syndicating them at 1,000 different web sites. To track the call activity that results from these promotions, the advertising company maintains a pool of 50,000 unique phone numbers.

For instance, at a single website, at the moment when a user searches for "dentist in Kansas City," the advertising company communicates with the website to insert advertisements for the ten dentists who have purchased advertising for the Kansas City area. The ten dentists have purchased the advertising by agreeing to "pay per call," meaning they will pay a fee, such as $5, at the moment a call comes in from a potential customer. The dentists can pay a higher fee if they would like to be displayed higher than their peers. The advertising company displays the dentists in descending order from the highest per-call price to the lowest.

When the advertising company displays the three advertisements upon the website, it dynamically allocates unique phone numbers that appear in the advertisements. This way, if a dentist is called by a potential customer, the advertising company can determine which website was responsible for the call taking place. It can also determine the time of the call and bill the dentist the amount the dentist had agreed to pay per call at that moment. Once having done so, the advertising company routes the call to the dentist's standard phone number, and the dentist receives the call.

Of the ten unique telephone numbers that were displayed, several of them were toll-free 1-800 or 1-866 numbers. One of them was a local Kansas City 913 area-code number because that dentist requested that his advertisement only be shown with a unique phone number that appears to be local.

The advertising company is syndicating the ten dentists' advertisements across 1,000 different websites. Throughout the day, it is continually displaying the ten dentists at hundreds of different sites, whenever an end user happens to search on dentists in Kansas City. In order to track the resulting call activity, if the advertising company were to allocate a unique telephone number for each dentist at each of the 1,000 websites, it would have to allocate 10,000 unique telephone numbers. Since unique telephone numbers are costly to provision and maintain, this would be a very expensive proposition. The advertising company must find a way to minimize the unique telephone numbers it allocates, and by no means can it use more than the 50,000 total unique numbers it has in its pool.

In order to reduce the unique telephone numbers it must allocate, the advertising company uses the present invention to dynamically allocate and recycle unique telephone numbers. In the case of the Kansas City dentists, it does not allocate all 10,000 combinations to begin with. Instead, it only allocates a unique telephone number at the moment a search is done for Kansas City dentists at a particular website. The dynamic, "just in time" allocation, prevents the wasteful allocation of numbers to advertisements that may never be summoned and displayed.

Recycling Allocated Telephone Numbers

In one embodiment, a system records that a particular advertiser's advertisement was displayed at a certain time at a particular website with a particular unique telephone number. As more and more advertisements are displayed at different websites, in one embodiment the system keeps track of when each of the allocated telephone numbers were respectively last displayed.

Figure 22:
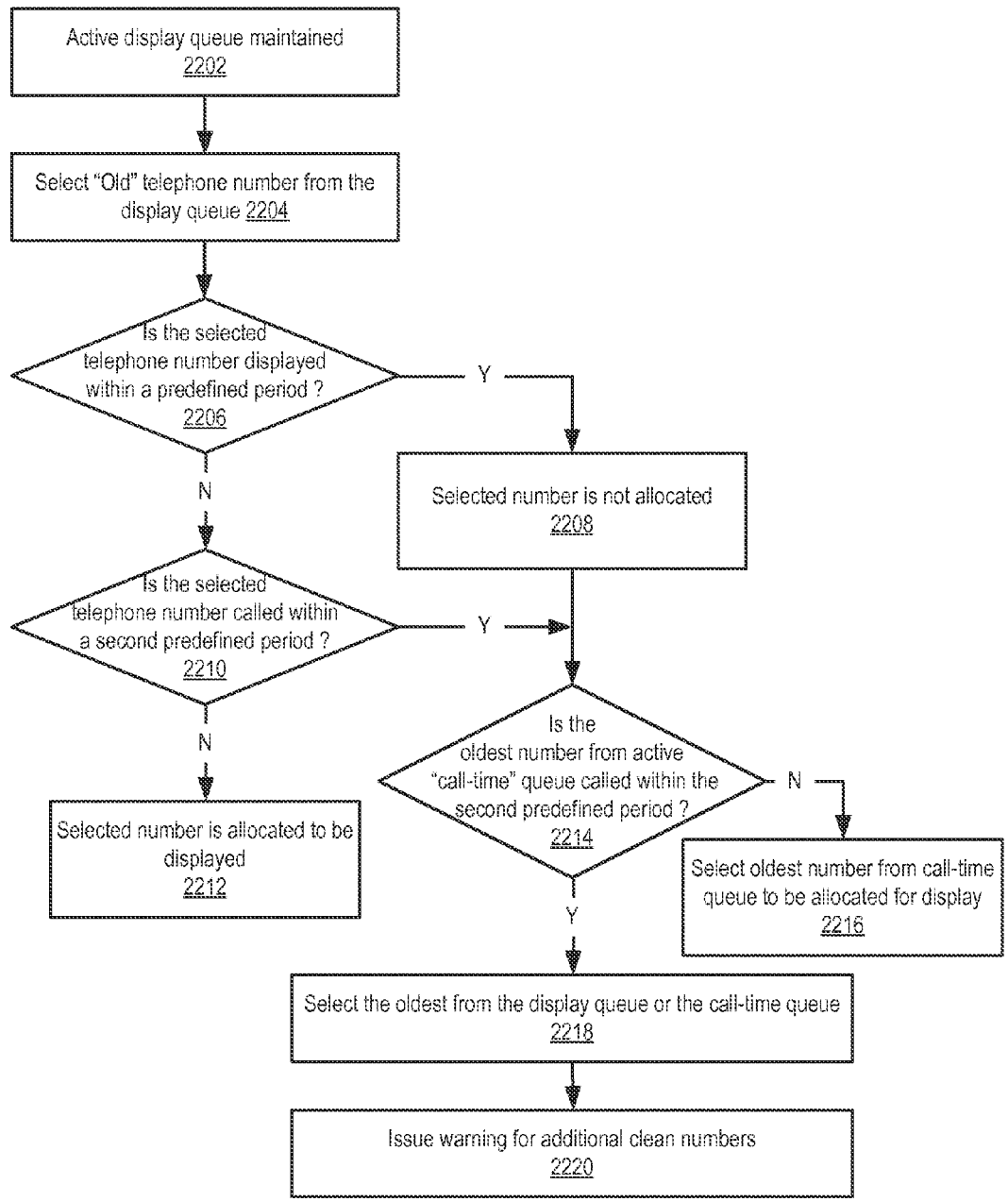
FIG. 22 presents a flow diagram describing one embodiment of recycling telephone numbers.

FIG. 22 presents a flow diagram describing one embodiment of recycling telephone numbers. In one embodiment, in process 2202 an active "display queue" of telephone numbers is maintained. The active display queue lists the telephone numbers according to the time they have been displayed from "youngest" (displayed recently) to "oldest" (displayed longer ago).

When, for instance, an advertiser's advertising is displayed at a particular website and a unique telephone number is required, in process 2204 a telephone is selected from the "oldest" end of the display queue, or a telephone number that has not relatively recently been displayed. Since presumably there is a finite pool of numbers it could be that the phone number that is picked has been used before. But since it is the "oldest" number-displayed perhaps five weeks ago, there is a greater probability that this number will not be confused with the advertisement it was displayed with in the past. In this way, telephone numbers are recycled based on the time of last display to reduce potential confusion.

In one embodiment, in process 2206 the system determines if the selected telephone number was recently displayed within a predefined period of time. For instance, the system can check whether a telephone number was displayed in a different context within, for example, in the last 24 hours. If the selected telephone number was displayed within the predefined period of time, in process 2208 then the number pool is in danger of over-recycling and the selected telephone number is not allocated at that time.

If the system determines the selected telephone number was not displayed within the predefined period of time, in one embodiment, in process 2210 the system proceeds to determine whether the selected telephone phone number was recently called within a predefined period of time. For example, if a telephone number was displayed on a dentist's advertisement three months ago, but last called yesterday, it could introduce confusion if the number is reallocated to a plumber today.

If the system determines that the selected telephone number has not been displayed within a predefined period of time (e.g., 24 hours) and has not been called within a second predefined period of time (e.g., the last 30 days), in process 2212 the system deems the selected telephone number to be safe, and the selected telephone number is allocated to be displayed in a new context.

As previously described, if the selected number (presumably the "oldest number" displayed) was last displayed within the predefined period of time, the selected number does not pass the minimum threshold. As a result, the number pool may then be in jeopardy of over-recycling and alternative measures are taken by the system to select a telephone number for allocation.

In one embodiment, the system then evaluates the number pool based on how often the numbers have been called. In one embodiment, the system maintains an active "call-time queue" of the telephone numbers that have been called, listing them from "youngest" (called recently) to "oldest" (called longer ago). In process 2214, if the "oldest" number in the display queue was last displayed within the predefined period of time, in one embodiment, the system then evaluates the "oldest" number in the call-time queue. If the "oldest" number in the call-time queue was last called in greater than the second predefined threshold, then system selects the "oldest" number in the call-time queue to be allocated.

If neither the "oldest" number in the display queue nor the "oldest" number in the call-time queue meets the respective minimum thresholds, then other measures may be taken by the system. In process 2216, the system evaluates which of the two "oldest" numbers is closer to meeting its respective safety threshold, and selects that telephone number to be allocated for display. By evaluating numbers according to the time of last display and time of last call, the system recycles numbers with the reduced probability for end-user confusion.

Due to the dual queue procedures, the system will not break catastrophically—it will only become gradually less safe if is overburdened. If numbers are displayed and called too often, all numbers will be below the minimum display and call thresholds, but the system will still function. In fact, it will produce the most safe number given the pool it has to deal with. In the case of overburden, the system will automatically cycle through the numbers faster, making them collectively more "dirty," but not failing. In such a case, in process 2218 the system automatically issues a warning to the administrator at this point, indicating that more "clean" numbers need to be added to the number pool. In alternative embodiments, more or less of the processes described in relation to FIG. 22 may be used.

Figure 23:
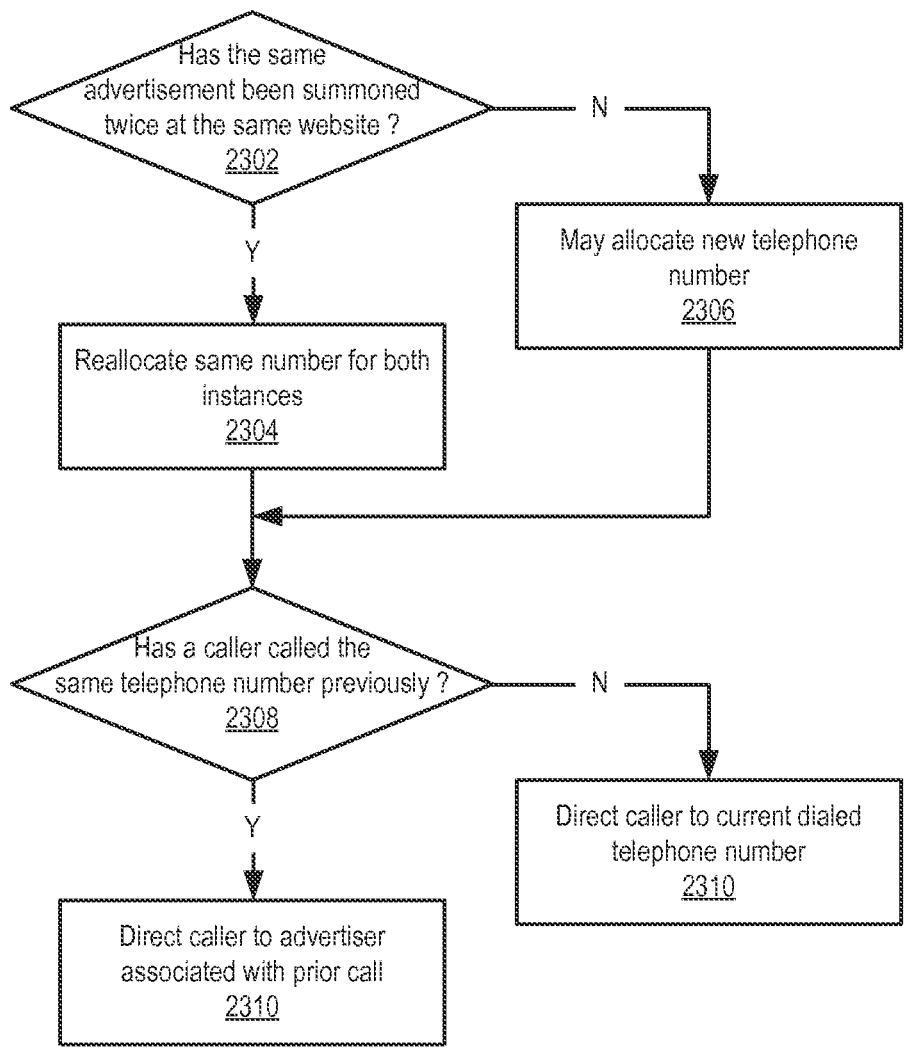
FIG. 23 provides a flow diagram describing additional processes for allocating telephone numbers in accordance with one embodiment.

In addition to optimizing the cleanliness of the pool of telephone numbers, one embodiment of the system may execute procedures to improve efficiency of allocating recycled telephone numbers. FIG. 23 provides a flow diagram describing additional processes for allocating telephone numbers in accordance with one embodiment. In process 2302 the system determines if a particular advertisement (or different advertisements associated with the same advertiser) has summoned twice at the same website. If the particular advertisement (or different advertisements associated with the same advertiser) has been summoned twice at the same website, in process 2304 the system will reallocate the same phone number for both instances. If the particular advertisement (or different advertisements associated with the same advertiser) has not been summoned twice at the same website, in process 2306 the system may allocate a new phone number.

In addition, in one embodiment, when a caller dials a unique phone number that has been allocated by the system for display, in process 2308 the system checks whether that caller (identified uniquely by their caller ID) has ever dialed that unique phone number before. If so, in process 2310 the system connects the caller with the advertiser that originally was associated with that unique phone number even if the phone number has now been reallocated to a second advertiser. The probability is the greatest that the caller is repeat-calling the original advertiser. The chances are small that the same caller would call two different merchants who both happen to have been allocated the same unique phone number by the system. Therefore, for the increased likelihood of success, the system connects the caller to the advertiser that the caller has called previously, even if the phone number has since been reallocated.

Figure 24:
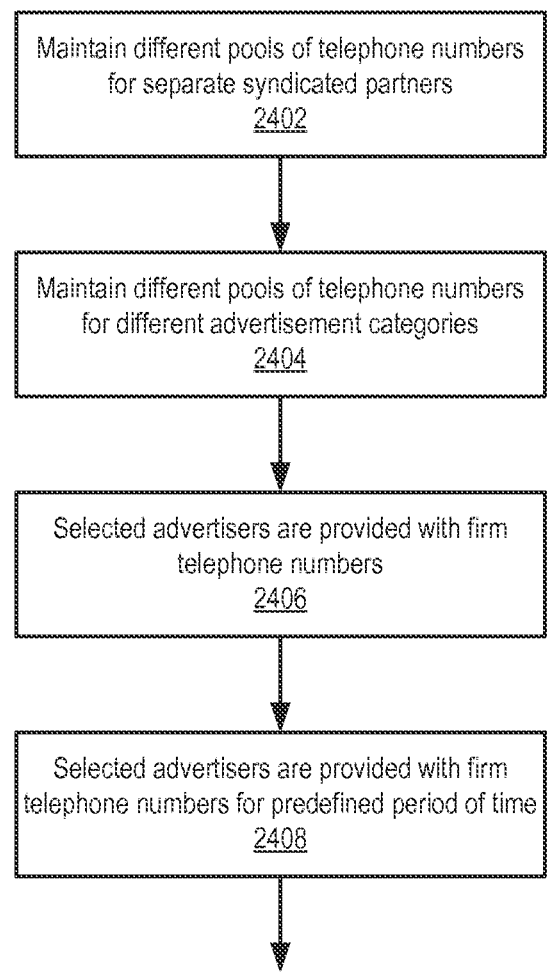
FIG. 24 presents a flow diagram describing the processes of maintaining the separate pools of unique telephone numbers in accordance with one embodiment.

In one embodiment, the system is also able to maintain separate pools of unique numbers based on a variety of factors. FIG. 24 presents a flow diagram describing the processes of maintaining the separate pools of unique telephone numbers in accordance with one embodiment. In process 2402, the system maintains different pools of telephone numbers corresponding to different partner syndicates. For instance, one large syndicate may request that none of its numbers ever be recycled to mix with a rival syndicate. In process 2404, the system maintains different pools of telephone numbers corresponding to different categories of advertisers. For example, the system may maintain separate telephone number pools for democratic and republican causes to reduce chances that callers will be connected by mistake to the other party.

In process 2406, in one embodiment, the system provides select advertisers, or groups of advertisers, with firm numbers that do not get recycled. Some advertisers, for instance, do not want their number to ever change or be recycled, and the system can omit these advertisers from the recycling procedures, to provide them with constant telephone numbers.

Similarly, in process 2408, in one embodiment, the system provides selected advertisers or groups of advertisers with specific telephone numbers for a specified duration of time. Afterwards, the telephone numbers may be recycled. For instance, a daily newspaper might publish the trackable phone numbers of the five travel agents who have special "deals of the day." In this case, the phone numbers should not change for the duration of at least one day, after which they could then enter the recycling process.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 25:
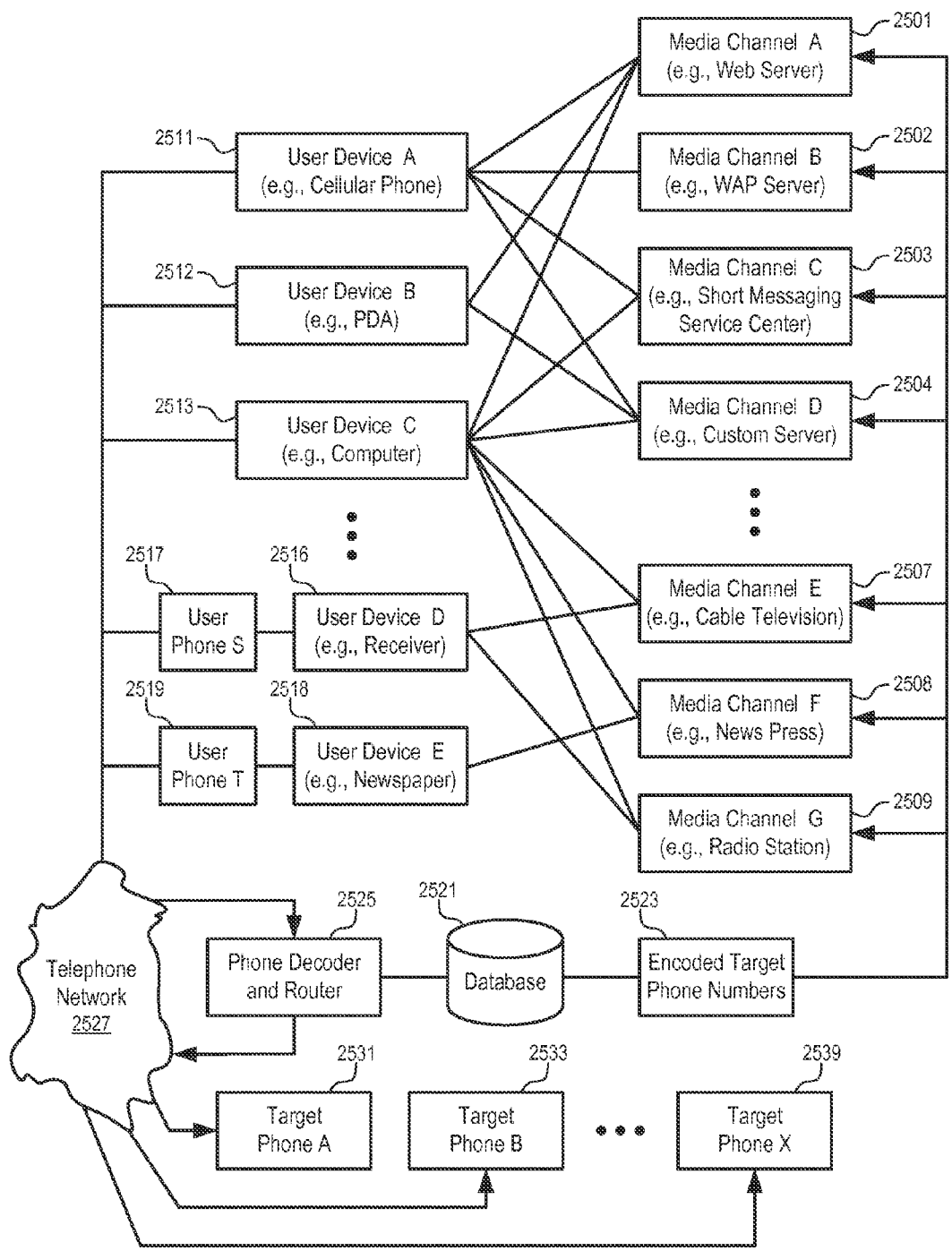
FIG. 25 shows a diagram of a system to make and track phone connections according to one embodiment of the present invention.

FIG. 25 shows a diagram of a system to make and track phone connections according to one embodiment of the present invention.

In FIG. 25, a database (2521) may contain the phone numbers of target phone A (2531), target phone B (2533), . . . , target phone X (2539), etc. Typically, the target phones belong to the institutions, businesses, individuals, etc, which seek for publicity through various media channels, such as media channel A (2501) (e.g., web server), media channel B (2502) (e.g., WAP server), media channel C (2503) (e.g., short messaging service center), media channel D (2504) (e.g., custom server), media channel E (2507) (e.g., cable television), media channel E (2508) (e.g., news press), media channel G (2509) (e.g., radio station), etc.

In one embodiment of the present invention, the phone numbers of the target phones are not directly publicized over the media channels. Instead, encoded target phone numbers (2523) are used. Using the encoded target phone numbers (2523), a user cannot reach target phones directly. The encoded target phone numbers (2523) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (2511) (e.g., cellular phone), user device B (2512) (e.g., personal digital assistant (PDA)), user device C (2513) (e.g., computer), user device D (2516) (e.g., receiver), user device E (2518) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (2517) or user phone T (2519).

In one embodiment of the present invention, dialing at least a portion of an encoded target phone number connects the phone call to a phone decoder and router (2525) first. According to the encoded target phone number dialed, the phone decoder and router (2525) determines the corresponding target phone number using the database (2521) and connects the phone call to the corresponding target phone (e.g., one of target phones 2531-2539) through the telephone network (2527).

Note the telephone network (2527) may be circuit switched, packet switched, or partially circuit switched and partially packet switched. For example, the telephone network may partially use the Internet to carry the phone call (e.g., through VoIP). For example, the connection between the user phone/device and the phone decoder and router (2525) may be carried using VoIP; and the connection between the phone decoder and router (2525) may be carried using a land-line based, circuit switched telephone network.

In one embodiment of the present invention, the information associated with the encoded target phone number, such as the media channel used to provide the encoded target phone number to the users, is also decoded/retrieved using the database (2521). Thus, the information associated with the encoded target phone number can be tracked/stored.

In one embodiment, the phone decoder and router (2525) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (2525). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (2525) through the telephone network (2527); and a second portion of the encoded target phone number is to be decoded by the phone decoder and router (2525). For example, the Dual Tone Multi-Frequency (DTMF) decoder can be installed in the phone decoder and router (2525) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (2525) for different target phone numbers; and the portion of the encoded target phone number that is used to reach the phone decoder and router (2525) is not used in determining the information associated with the encoded target phone number.

Alternatively, multiple telephone numbers can be used to reach the phone decoder and router (2525); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (2521) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (2525). When such a mapping scheme is used, a look up table is not necessary. For example, an encoded target phone number may include a first portion that is the phone number of the phone decoder and router (2525), a second portion that is the target phone number appended with a number mapped from an identifier of the media channel. To prevent the user from dialing the target phone number directly, an encryption/scrambling scheme can be used to encode the second portion, which is decoded at the phone decoder and router (2525).

In one embodiment of the present invention, the phone decoder and router (2525) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (2525), pauses for a short period of time for the phone decoder and router (2525) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 25, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

In one embodiment, a communication reference, such as a phone number with or without an extension, a click-to-call reference, a SIP address for VoIP call, a click-to-reveal reference, etc., is embedded into an advertisement to count, the communication leads generated from advertisements, to track the contributions of demand partners who operate media channels to present the advertisements to customers, and/or to track other aspects of advertising, such as partners who bring the advertisers/sellers to the system.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is will to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

In one embodiment, based on such considerations, tracking mechanisms are selected for the tracking of particular versions of particular advertisements to improve the cost effectiveness of the system in advertising.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner, or to a web browser of a customer). For example, the tracking mechanism used in an advertisement that is to be presented via a particular demand partner can be upgraded or downgraded based on the statistical data collected from the past activities related to the advertisement.

FIGS. 26-30 illustrate examples of telephone call tracking mechanisms which can be selected according to embodiments of the present invention.

Figure 26:
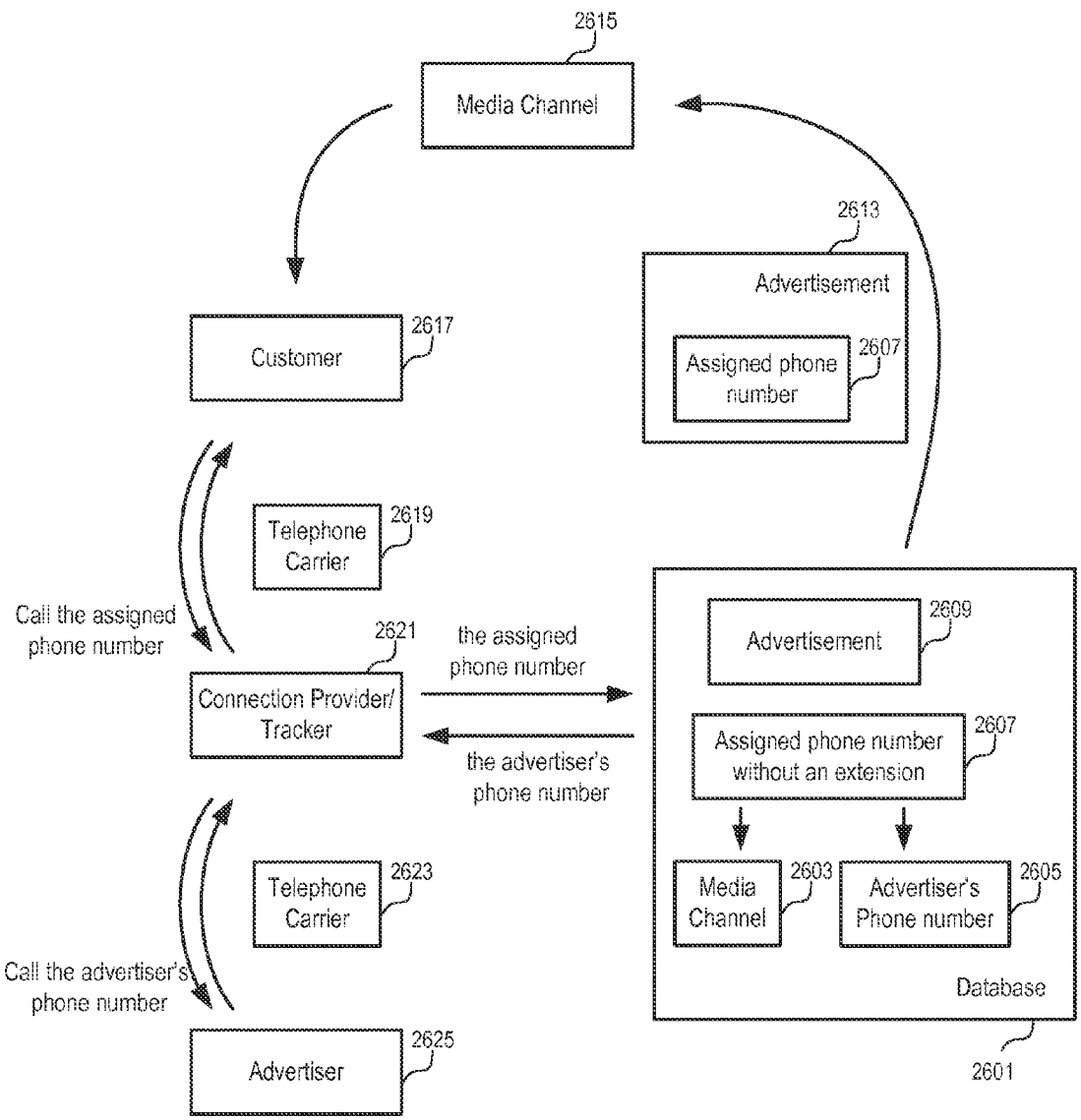
FIGS. 26-30 illustrate examples of telephone call tracking mechanisms which can be selected according to embodiments of the present invention.

In FIG. 26, a phone number (2607) without an extension is assigned for the generation a particular version (2613) of an advertisement (2609). In the database (2601), the assigned phone number (2607) is associated with the media channel (2603) and the advertiser's phone number (2605) (and/or other parameters to be tracked). Thus, the parameters to be tracked can be identified based at least partially on the assigned phone number (2607). The particular version (2613) of the advertisement (2609) that has the assigned phone number (2607) is provided to the customer (2617) via the media channel (2615). The advertisement may instruct or suggest the customer to call the assigned phone number (2607) to reach the advertiser. In response to the advertisement, the customer may call the assigned phone number (2607). When the connection provider/tracker (2621) is called at the assigned phone number via the telephone carrier (2619), the connection provider/tracker (2621) can identify the assigned phone number (e.g., via a Dialed Number Identification Service (DNIS)) and determine the advertiser's phone number (2605) based at least partially on the assigned phone number (2607). Further, using the assigned phone number, it can also be determined that the phone call from the customer is a response to an advertisement that is delivered via the media channel (2615) based on the association between the assigned phone number (2607) and the media channel (2603) in the database (2601).

In one embodiment, after determining the advertiser's phone number from the assigned phone number that is dialed by the customer (2617), the connection provider/tracker (2621) makes a separate call to the advertiser (2625) via a telephone carrier (2623) which may be the same as the telephone carrier (2619). When both the customer (2617) and the advertiser (2625) are on the line with the connection provider/tracker (2621), the connection provider/tracker (2621) can bridge or conference the calls to connect the customer (2617) and the advertiser (2625). Alternatively, the connection provider/tracker (2621) may forward the calls from the customer (2617) to the advertiser (2625) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Figure 27:
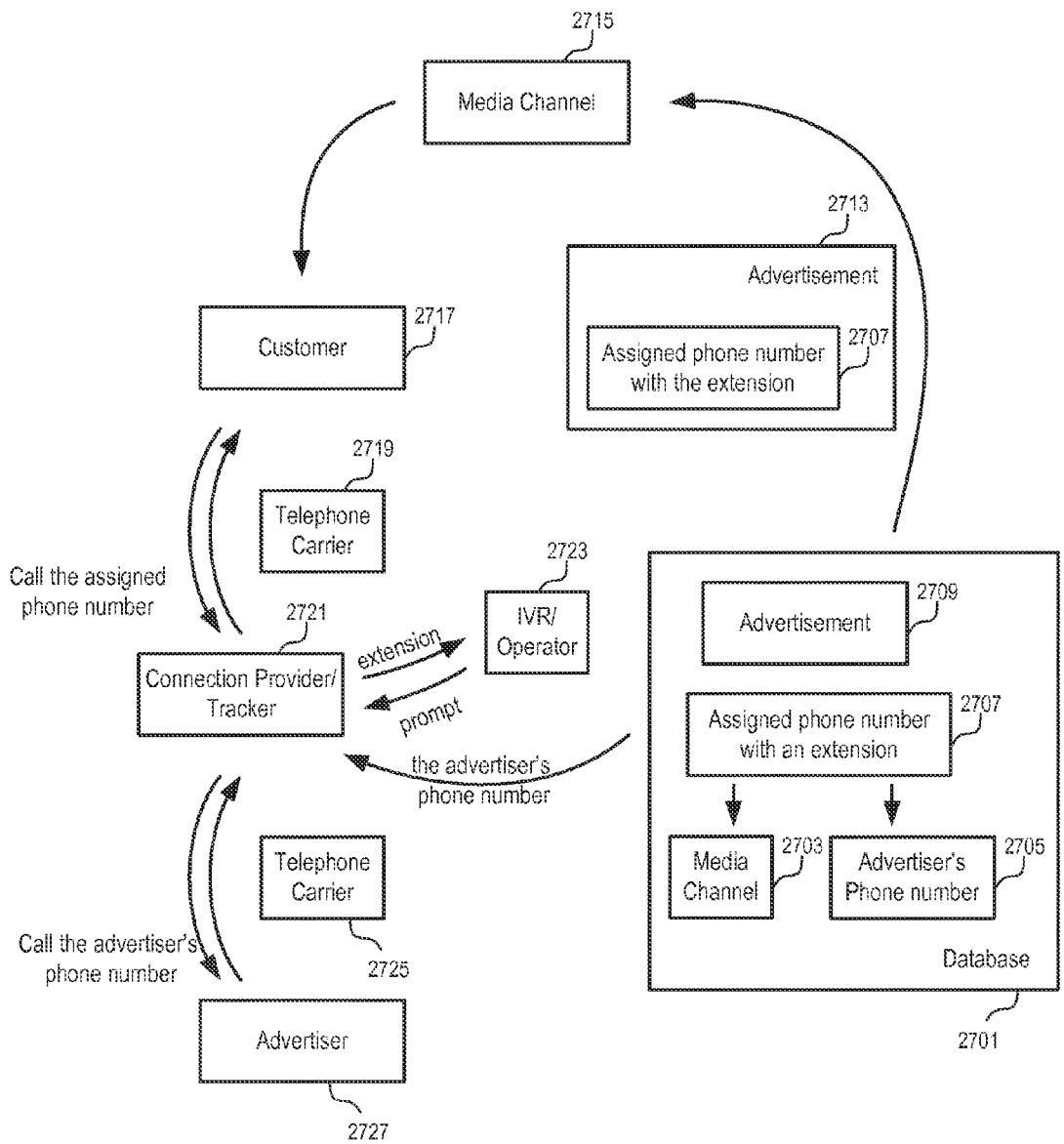

Since maintaining different phone numbers may increase the tracking cost, another type of tracking mechanism that uses different extensions to differentiate tracked parameters is illustrated in FIG. 27.

In FIG. 27, a phone number (2707) with an extension is assigned to generate a particular version (2713) of an advertisement (2709). In the database (2701), the assigned phone number (2707) with the extension is associated with the media channel (2703) and the advertiser's phone number (2705) (and/or other parameters to be tracked). For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

The particular version (2713) of the advertisement (2709) that has the assigned phone number (2707) with the extension is provided to the customer (2717) via the media channel (2715). In response to the advertisement, the customer may call the assigned phone number (2707). In one embodiment, the connection provider/tracker (2721) is called at the root number of the assigned phone number via the telephone carrier (2719). Once the customer is connected to the connection provider/tracker (2721), the customer can further provide the extension to the connection provider/tracker (2721). For example, the customer (2717) can provide the extension to an IVR system or a human operator of the connection provider/tracker (2721). The extension can be provided as voice input, or as dial pad input.

In one embodiment, the IVR system or the human operator (2723) can prompt the customer (2717) for the extension that is provided in the advertisement. In one example, when the dialed root number is sufficient to identify information about the media channel, the IVR system or the human operator (2723) may customize the prompt to include the information of the media channel and ask the customer (2717) to further provide the extension to reach the desired advertiser (2727). In another example, when the dialed root number is sufficient to identify information about the advertiser, the IVR system or the human operator (2723) may customize the prompt to include the information of the advertiser and ask the customer (2717) to further provide the extension to reach the desired advertiser (2727).

In one embodiment, based on the assigned phone number with the extension, the connection provider/tracker (2721) associates the call with the corresponding parameters stored in the database (2701), including the advertiser's phone number, and connect the customer (2717) to the advertiser (2727). The connection provider/tracker (2721) can call the advertiser (2727) at the advertiser's phone number via the telephone carrier (2725) which may or may not be the same as the telephone carrier (2719).

In one embodiment, the extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database (2701). Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, when the advertiser (2725) is currently not available to take the call at the time the customer (2717) calls, the customer (2717) is provided with the option to be called back within a time window, if the customer (2717) is willing to provide a phone number at which the customer (2717) can be reached. The system can then schedule the callback to connect the customer (2717) and the advertiser (2727) accordingly.

Figure 28:
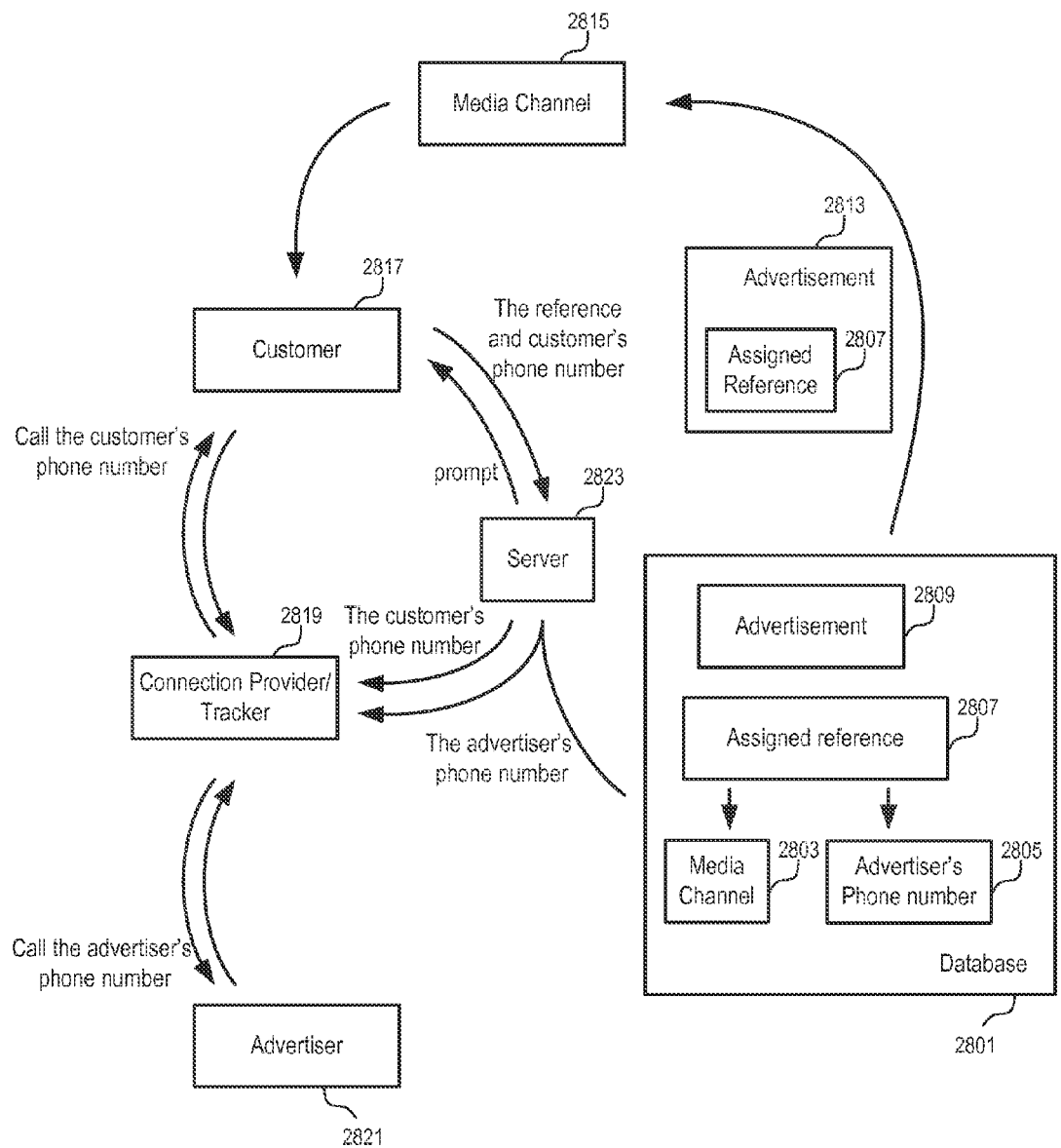

In one embodiment, the connection provider/tracker calls the customer instead of providing a phone number to receive a phone call from the customer, as illustrated in FIG. 28. In FIG. 28, a reference (2807) is assigned for the generation a particular version (2813) of an advertisement (2809). In the database (2801), the assigned reference (2807) is associated with the media channel (2803) and the advertiser's phone number (2805) (and/or other parameters to be tracked). In one embodiment, the reference (2807) cannot be used to make a call via a traditional telephone carrier. In one embodiment, the reference (2807) is a key used in the database (2801) to look up the associated parameters, such as the media channel (2803) and the advertiser's phone number (2805). In one embodiment, the reference (2807) is an encoded/encrypted version of the associated parameters, such that an authorized data system (e.g., server 2823) can decode/decrypt the information without having to look up from the database.

In FIG. 28, the particular version (2813) of the advertisement (2809) that has the assigned reference (2807) is provided to the customer (2817) via the media channel (2815). In response to the advertisement, the customer may use the assigned reference (2807) to request a connection with the advertiser.

In one embodiment, the reference (2807) is embedded in the advertisement as a parameter of a link or a parameter of a button, which when selected by the customer (2817) causes the server (2823) to provide a prompt to ask for a telephone number at which the customer can be reached. Alternatively, the advertisement may include a form to accept collect the callback phone number, which is transmitted to the server with the parameter when the link or button is selected. The server (2823) uses the reference (2807) received from the customer (2817) to identify the parameters that are associated with the particular version (2813) of the advertisement (2809). Alternatively, the customer may request the connection via a web page, an email, an instant message, a phone call to a gateway system, an SMS message, etc.

In FIG. 28, after the server (2823) determines the advertiser's phone number from the assigned reference and receives the customer's phone number, the connection provider/tracker (2819) makes separate calls to the customer's phone number and the advertiser's phone number and bridges/conferences the calls to connect the customer (2817) and the advertiser (2821).

Figure 29:
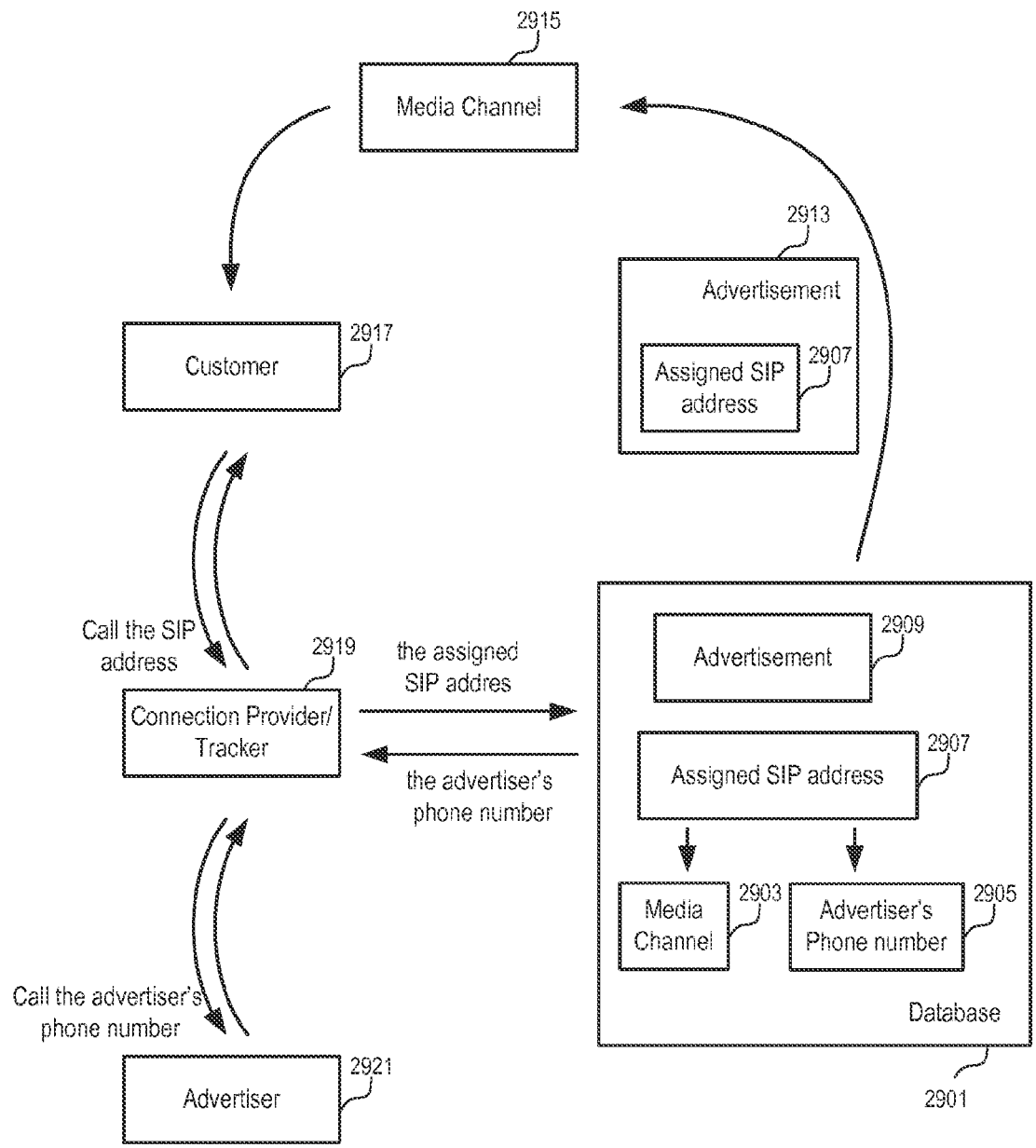

In one embodiment, a telephone number assigned to a version of an advertisement includes a SIP address for the initiation of a VoIP-based telephone call, as illustrated in FIG. 29. In one embodiment, the assigned SIP address (2907) is used as a key in the database (2901) to look up the associated parameters, such as media channel (2903), the advertiser's phone number (2905), etc. In one embodiment, the assigned SIP address (2907) includes an encoded/encrypted version of at least some of the associated parameters such that an authorized data system can decode/decrypt the information without having to query the database (2901).

In FIG. 29, the assigned SIP address (2911) is embedded into the advertisement (2909) to generate a version (2913) for the media channel (2915), which delivers the advertisement to the customer (2917) (e.g., via an audio channel, a visual channel, a data channel, or a multi-media channel). In response to the advertisement, the customer can call the connection provider/tracker (2919) at the SIP address (e.g., using a VoIP application/phone). Based on the SIP address used in initiating the VoIP call, the advertiser's phone number is determined. The connection provider/tracker (2919) then connections the customer (2917) and the advertiser (2921).

In one embodiment, when the customer (2917) is already in a phone connection with the media channel (2915), such as when the media channel (2915) is a telephone based directory service, the media channel (2915) may forward the call to the assigned IP address. Alternatively, the media channel (2915) may conference/bridge the customer's call with a call to the connection provider/tracker (2919) at the assigned SIP address. Such an arrangement of having the media channel to connect the existing call to the connection provider/tracker (2919) (e.g., through forwarding or conferencing) can also be used in connection with other types of tracking mechanisms (e.g., tracking using a phone number, with or without an extension).

Figure 30:
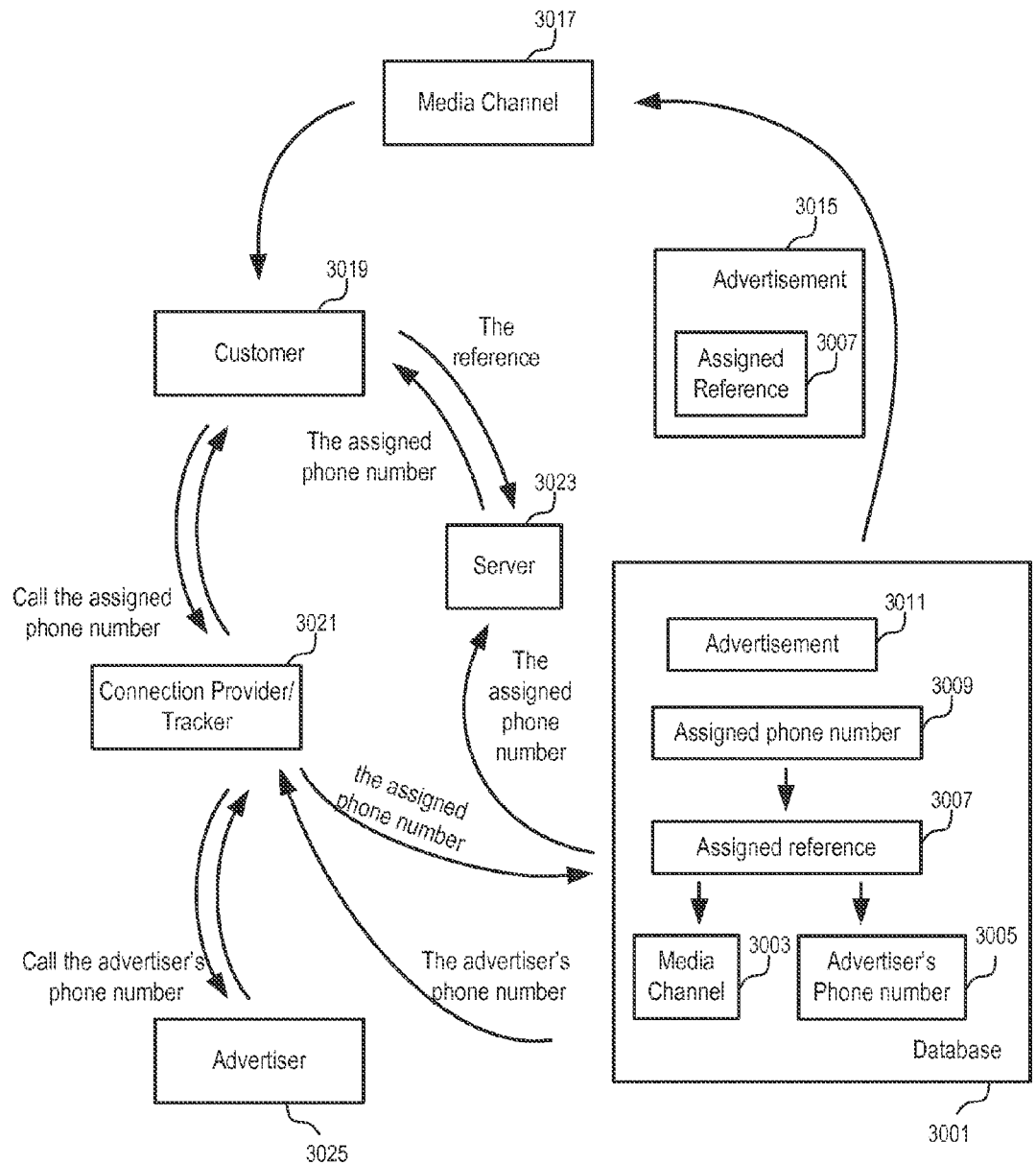

In one embodiment, the allocation of a telephone number to an advertisement is deferred to a stage when a customer is interested in the advertisement and ready to make a phone call, as illustrated in FIG. 30. In FIG. 30, an assigned reference (3007) is used to represent the set of parameters of a version of an advertisement, such as the media channel (3003), advertiser's phone number (3005), etc. The reference can be used as a key to look up the parameters in the database (3001), and/or decoded/decrypted to obtain at least some of the parameters without having to query the database (3001). The assigned reference (3007) is embedded in the version (3015) of the advertisement (3011) for distribution by the medial channel (3017).

In FIG. 30, the advertisement is presented in a way to allow the customer (3019) to request an assigned phone number for the version of the advertisement. The assigned phone number may be a phone number without an extension, or a phone number with an extension, or a SIP address. If the customer is not interested in the advertisement, the customer may not request the assigned phone number.

In one embodiment, the reference is implemented as a parameter of a link or a button. When the button or the link is selected by the customer, the server (3023) receives the request together with the reference from the customer, and the server (3023) causes a phone number (3009) to be associated with the set of parameters of the version (3015) of the advertisement (3011). The server (3023) then provides the assigned phone number to the customer.

For example, when the button is clicked, the web page showing the version of the advertisement may submit the reference to the server to obtain the assigned phone number and display the assigned phone number (e.g., in a pop up window, on a separate layer of the web page, or in a modified element of the web page). In one embodiment, the phone number is displayed in the current web page without reloading or refreshing the web page or load a separate web page. In one embodiment, the customer (3019) can request for the assigned phone number via a web page, an email, an instant message, an SMS message, a phone call, a voice mail, etc.

After the customer (3019) obtains the assigned phone number, the customer (3019) can call the connection provider/tracker (3021) at the assigned phone number (3009), based on which the connection provider/tracker (3021) can further connect the customer (3019) to the advertiser (3025).

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has an VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further web page is displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. If for instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement of being called is estimated based on the type of media channels used to present the advertisement, the demand partner responsible to deliver the advertisement, and/or the customer who views the advertisement. Any characteristics in advertising that have an impact on the likelihood of an advertisement of being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement, in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 31:
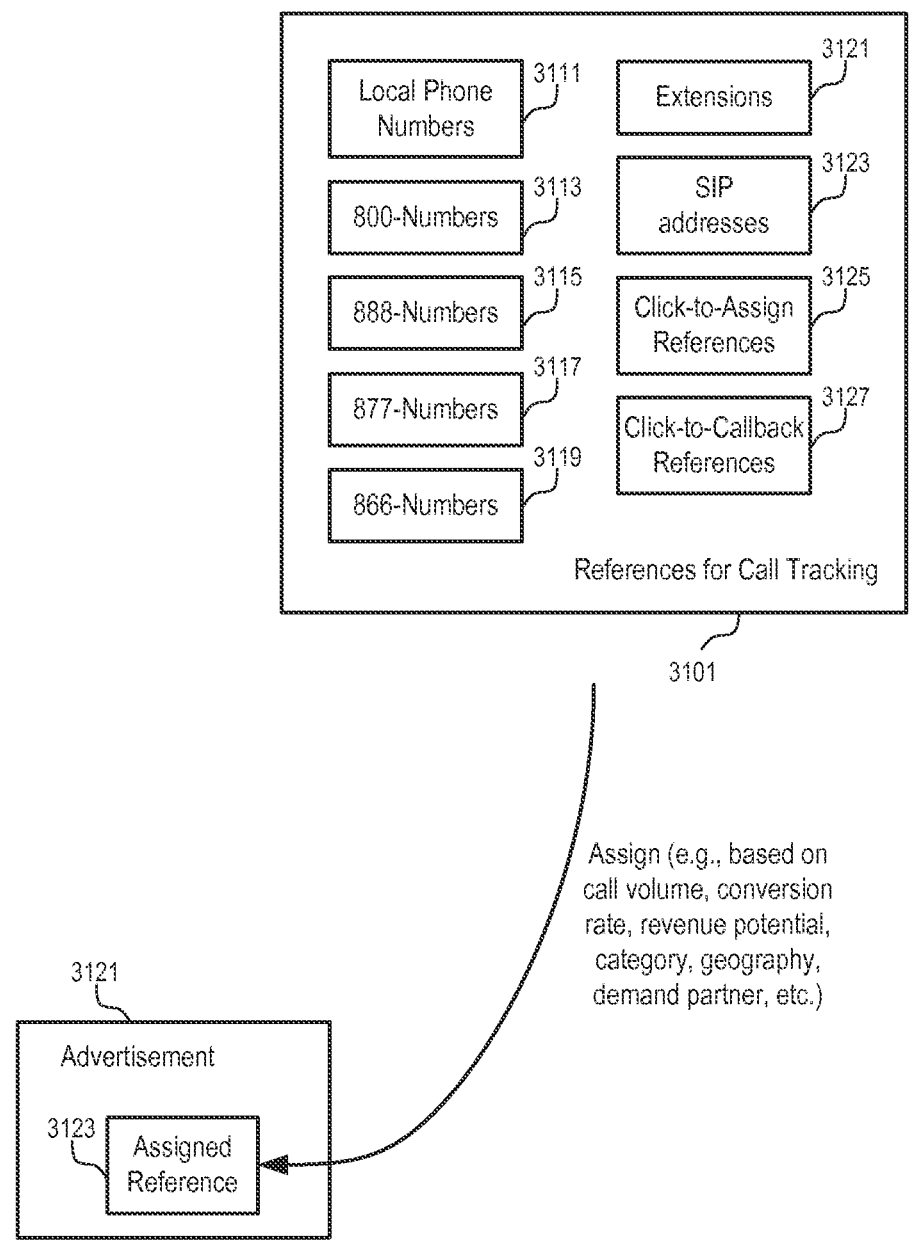
FIG. 31 shows a diagram illustrating a method to select a type of tracking mechanism with a corresponding reference for embedding in an advertisement according to one embodiment of the present invention.

FIG. 31 shows a diagram illustrating a method to select a type of tracking mechanism with a corresponding reference for embedding in an advertisement according to one embodiment of the present invention. In FIG. 31, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 31, a pool of different types of references (3101) are maintained, such as local phone numbers (3111), 800-numbers (3113), 888-numbers (3115), 877-numbers (3117), 866-numbers (3119). Some of the references can be dynamically generated and used, such as extensions (3121), SIP addresses (3123), click-to-assign references (3125) and click-to-callback references (3127). In one embodiment, one or more of the references are selected and used as the assigned reference (3123) that is embedded in the advertisement (3121). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

Figure 32:
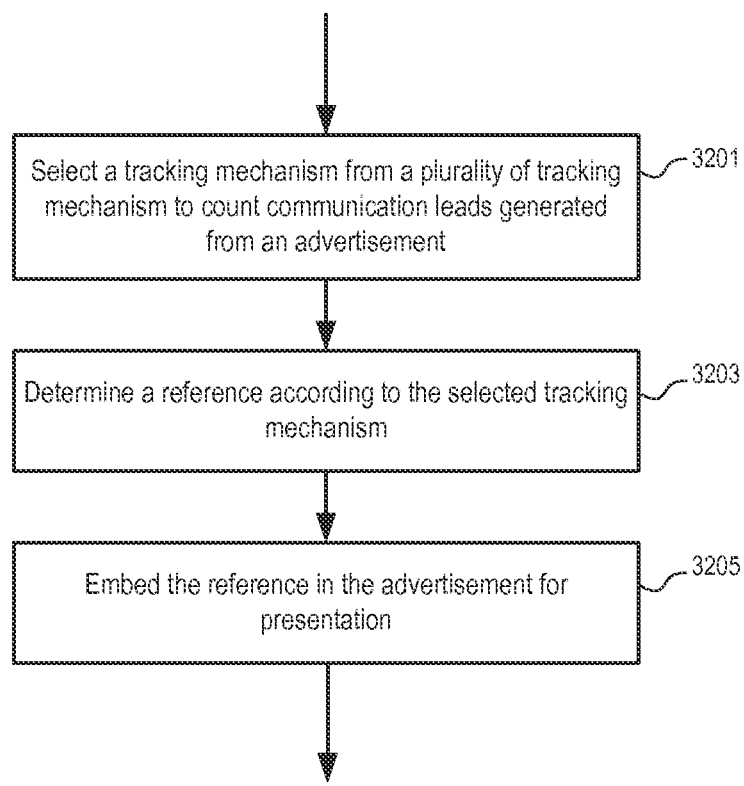
FIG. 32 shows a flow diagram of a method to provide an advertisement according to one embodiment of the present invention.

FIG. 32 shows a flow diagram of a method to provide an advertisement according to one embodiment of the present invention. In FIG. 32, a tracking mechanism is selected (3201) from a plurality of tracking mechanism to count communication leads generated from an advertisement. In one embodiment, the communication leads generated from the advertisement are used to measure the performance of the advertisement; and the advertisement is paid based on the performance of the advertisement. For example, the advertisement may be charged based on the number of communication leads generated by the advertisement; and the price per communication lead can be specified by the advertiser. Alternatively, other measurements based on counting the communication leads generated from the advertisements can also be used.

In FIG. 32, a reference is determined (3203) according to the selected tracking mechanism. For example, if the selected tracking mechanism uses a toll free telephone number without an extension, a toll free telephone number is selected from a pool of toll free telephone numbers for the advertisement. Data indicating the association between the toll free telephone number and the particular version of the advertisement is stored. For example, if the selected tracking mechanism using a telephone number with an extension, an extension is selected such that the phone number and the extension as a whole can be used to identify the particular version of the advertisement, which may include a number of parameters to be tracked, such as the demand partner responsible to deliver the advertisement to the customer, a media channel used by the demand partner to deliver the advertisement to the customer, the advertiser's phone number, a partner who is responsible for getting the advertiser/advertisement, etc.

In FIG. 32, the reference is embedded (3205) in the advertisement for presentation. References for different tracking mechanisms may be presented differently. For example, an assigned phone number may be displayed or read out to the customer; a SIP address may be presented as a button for VoIP call; and a reference to request a callback may be presented as an icon or a link, etc.

In one embodiment, a method includes: selecting one reference type from a plurality of reference types; and determining a reference of the selected type, the reference to be embedded in an advertisement to count communication leads generated from the advertisement.

In one embodiment, the advertisement is to be charged according to a performance measure based on communication leads generated from the advertisement. For example, a price for the advertisement can be specified by a party for which the advertisement is to be presented. For example, the advertisement can be charged in response to a voice communication responding to the advertisement. In one embodiment, the plurality of reference types correspond to different mechanisms to track communication leads generated from the advertisement.

In one embodiment, the plurality of reference types include at least one of a phone number without an extension, a phone number with an extension, a Session Initiation Protocol (SIP) address; and a reference to request a callback in reference to the advertisement.

In one embodiment, the selected type includes a reference to request for a communication contact in reference to the advertisement; and in response to receiving a request via the reference, a further reference of a type selected from a plurality of reference types is determined and presented. The further reference can be a phone number without an extension, a phone number with an extension, or a Session Initiation Protocol (SIP) address.

In one embodiment, the reference type is selected in response to a request for one or more advertisements. Alternatively, the reference type is selected in response to a search request; and the advertisement is provided as part of a search result in response to the search request.

In one embodiment, data is stored to associate the reference with the advertisement; and the advertisement is selected in response to a request from a partner and provided to the partner for presentation to a customer. In one embodiment, further data is stored to associate the reference with the partner, who is to be credited/compensated for presenting the advertisement based on communication leads generated from the advertisement.

In one embodiment, the advertisement is selected in response to a request from a partner; the reference is embedded in the advertisement; and the advertisement is transmitted to the partner for presentation to a customer.

In one embodiment, the reference type is selected based at least partially on statistical data related to the advertisement, such as a count of past communication leads generated from the advertisement, a ratio between a count of presentations of the advertisement and a count of communication leads resulting from the presentations, and an average frequency of past communication leads generated from the advertisement.

In one embodiment, the reference type is selected based at least partially on a price per communication lead of the advertisement, or an advertising category of the advertisement, or a geographical area served by the advertisement.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
processing a transmission received via a network by a server system, the transmission corresponding to a request for an advertisement; in response to the request:
estimating by the server system a likelihood of response to an advertisement based at least in part on the request;
based at least in part on the estimated likelihood of response, selecting by the server system a first tracking mechanism from a plurality of different tracking mechanisms;
transmitting by the server system a version of the advertisement via the network, the version of the advertisement comprising the first tracking mechanism;
based at least in part on using the first tracking mechanism, collecting by the server system data about responses related to the advertisement;

processing a subsequent transmission received via the network by the server system, the subsequent transmission corresponding to a subsequent request for the advertisement; and in response to the subsequent request:

based at least in part on an evaluation of the collected data about responses related to the advertisement, selecting by the server system a second tracking mechanism, wherein the second tracking mechanism is different from the first tracking mechanism; transmitting by the server system a second version of the advertisement via the network, the second version of the advertisement comprising the second selected tracking mechanism;

collecting by the server system data about presentations related to the advertisement;

wherein the evaluation comprises evaluating by the server system the collected data about responses related to the advertisement and the collected data about presentations at least in part by determining a performance ratio between a count of presentations of the first version of the advertisement and a count of responses resulting from the presentations; and wherein the selecting the second tracking mechanism corresponds to:

upgrading the advertisement from the first tracking mechanism to have the second tracking mechanism when the performance ratio satisfies a predetermined threshold; and downgrading the advertisement from the first tracking mechanism to have the second tracking mechanism when the performance ratio does not satisfy the predetermined threshold.

2. The method of claim 1, wherein the estimating the likelihood of response to the advertisement based at least in part on the request comprises:

identifying at least one characteristic of:
 a media channel for delivery of the advertisement;
 a partner designated to deliver the advertisement; and/or
 a customer targeted for presentation of the advertisement;
wherein the estimating the likelihood of response is based at least in part on the at least one characteristic.

3. The method of claim 1, wherein the selecting the second tracking mechanism corresponds to upgrading the advertisement from the first tracking mechanism to have the second tracking mechanism.

4. The method of claim 1 wherein the selecting the second tracking mechanism corresponds to downgrading the advertisement from the first tracking mechanism to have the second tracking mechanism.

5. The method of claim 1, wherein the evaluation comprises evaluating by the server system the collected data about responses related to the advertisement at least in part by determining a volume and/or a frequency of responses generated from the first version of the advertisement.

6. The method of claim 1, wherein the selecting of the second tracking mechanism is based at least in part on a category of a service or product corresponding to the advertisement and/or based at least in part on a geographical area served by the advertisement.

7. One or more non-transitory, processor-readable media storing instructions that, when executed by a server system, cause the server system to:

process a transmission received via a network by the server system, the transmission corresponding to a request for an advertisement; in response to the request:

estimate a likelihood of response to an advertisement based at least in part on the request;

based at least in part on the estimated likelihood of response, select a first tracking mechanism from a plurality of different tracking mechanisms;

transmit a version of the advertisement via the network, the version of the advertisement comprising the first tracking mechanism;

based at least in part on using the first tracking mechanism, collect data about responses related to the advertisement;

process a subsequent transmission received via the network by the server system, the subsequent transmission corresponding to a subsequent request for the advertisement; and in response to the subsequent request:

based at least in part on an evaluation of the collected data about responses related to the advertisement, select a second tracking mechanism, wherein the second tracking mechanism is different from the first tracking mechanism;

transmit a second version of the advertisement via the network, the second version of the advertisement comprising the second selected tracking mechanism;

collect data about presentations related to the advertisement;

wherein the evaluation comprises evaluating by the server system the collected data about responses related to the advertisement and the collected data about presentations at least in part by determining a performance ratio between a count of presentations of the first version of the advertisement and a count of responses resulting from the presentations; and wherein the selecting the second tracking mechanism corresponds to:

upgrading the advertisement from the first tracking mechanism to have the second tracking mechanism when the performance ratio satisfies a predetermined threshold; and downgrading the advertisement from the first tracking mechanism to have the second tracking mechanism when the performance ratio does not satisfy the predetermined threshold.

8. The one or more non-transitory, processor-readable media of claim 7, wherein the estimating the likelihood of response to the advertisement based at least in part on the request comprises:

identifying at least one characteristic of:
 a media channel for delivery of the advertisement;
 a partner designated to deliver the advertisement; and/or
 a customer targeted for presentation of the advertisement;
wherein the estimating the likelihood of response is based at least in part on the at least one characteristic.

9. The one or more non-transitory, processor-readable media of claim 7, wherein the selecting the second tracking mechanism corresponds to upgrading the advertisement from the first tracking mechanism to have the second tracking mechanism.

10. The one or more non-transitory, processor-readable media of claim 7, wherein the selecting the second tracking mechanism corresponds to downgrading the advertisement from the first tracking mechanism to have the second tracking mechanism.

11. The one or more non-transitory, processor-readable media of claim 7, wherein the evaluation comprises evaluating by the server system the collected data about responses related to the advertisement at least in part by determining a volume and/or a frequency of responses generated from the first version of the advertisement.

12. The one or more non-transitory, processor-readable media of claim 7, wherein the selecting of the second tracking mechanism is based at least in part on a category of a service or product corresponding to the advertisement and/or based at least in part on a geographical area served by the advertisement.

13. A system comprising:
a server system comprising one or more servers communicatively coupled to a data store, the server system further comprising memory coupled to the one or more servers and storing instructions that, when executed by the one or more servers, cause the server system to:
process a transmission received via a network by the server system, the transmission corresponding to a request for an advertisement; in response to the request:
estimate a likelihood of response to an advertisement based at least in part on the request;
based at least in part on the estimated likelihood of response, select a first tracking mechanism from a plurality of different tracking mechanisms;
transmit a version of the advertisement via the network, the version of the advertisement comprising the first tracking mechanism; based at least in part on using the first tracking mechanism, collect data about responses related to the advertisement;
process a subsequent transmission received via the network by the server system, the subsequent transmission corresponding to a subsequent request for the advertisement; and in response to the subsequent request:
based at least in part on an evaluation of the collected data about responses related to the advertisement, select a second tracking mechanism, wherein the second tracking mechanism is different from the first tracking mechanism;
transmit a second version of the advertisement via the network, the second version of the advertisement comprising the second selected tracking mechanism;
collect data about presentations related to the advertisement;
wherein the evaluation comprises evaluating by the server system the collected data about responses related to the advertisement and the collected data about presentations at least in part by determining a performance ratio between a count of presentations of the first version of the advertisement and a count of responses resulting from the presentations; and
wherein the selecting the second tracking mechanism corresponds to:
upgrading the advertisement from the first tracking mechanism to have the second tracking mechanism when the performance ratio satisfies a predetermined threshold; and
downgrading the advertisement from the first tracking mechanism to have the second tracking mechanism when the performance ratio does not satisfy the predetermined threshold.

14. The system of claim 13, wherein the estimating the likelihood of response to the advertisement based at least in part on the request comprises:
identifying at least one characteristic of:
a media channel for delivery of the advertisement;
a partner designated to deliver the advertisement; and/or
a customer targeted for presentation of the advertisement;
wherein the estimating the likelihood of response is based at least in part on the at least one characteristic.

15. The system of claim 13, wherein the selecting the second tracking mechanism corresponds to upgrading the advertisement from the first tracking mechanism to have the second tracking mechanism.

16. The system of claim 13, wherein the selecting the second tracking mechanism corresponds to downgrading the advertisement from the first tracking mechanism to have the second tracking mechanism.

17. The system of claim 13, wherein the selecting of the second tracking mechanism is based at least in part on a category of a service or product corresponding to the advertisement and/or based at least in part on a geographical area served by the advertisement.

* * * * *